US010223184B1

(12) United States Patent
McKelvie et al.

(10) Patent No.: US 10,223,184 B1
(45) Date of Patent: Mar. 5, 2019

(54) INDIVIDUAL WRITE QUORUMS FOR A LOG-STRUCTURED DISTRIBUTED STORAGE SYSTEM

(71) Applicant: Amazon Technologies, Inc., Reno, NV (US)

(72) Inventors: Samuel James McKelvie, Seattle, WA (US); Benjamin Tobler, Seattle, WA (US); James McClellan Corey, Bothell, WA (US); Pradeep Jnana Madhavarapu, Mountain View, CA (US); Oscar Ricardo Moll Thomae, Seattle, WA (US); Christopher Richard Newcombe, Kirkland, WA (US); Yan Valerie Leshinsky, Kirkland, WA (US); Anurag Windlass Gupta, Atherton, CA (US)

(73) Assignee: Amazon Technologies, Inc., Reno, NV (US)

( * ) Notice: Subject to any disclaimer, the term of this patent is extended or adjusted under 35 U.S.C. 154(b) by 261 days.

(21) Appl. No.: 14/036,792

(22) Filed: Sep. 25, 2013

(51) Int. Cl.
*G06F 11/00* (2006.01)
*G06F 11/07* (2006.01)

(52) U.S. Cl.
CPC ...... *G06F 11/0727* (2013.01); *G06F 11/0709* (2013.01)

(58) Field of Classification Search
CPC ........... G06F 17/30575; G06F 11/1425; G06F 17/30578; G06F 11/2094; G06F 9/466; G06F 17/30194; G06F 11/1471; G06F 11/2058; G06F 11/2076; G06F 3/067; G06F 3/0617; G06F 17/30864; G06F 11/0727;

(Continued)

(56) References Cited

U.S. PATENT DOCUMENTS 5,280,612 A 1/1994 Lorie et al.
5,452,445 A 9/1995 Hallmark et al.
(Continued)

FOREIGN PATENT DOCUMENTS

CA 2783370 7/2011
EP 0675451 10/1995
(Continued)

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Jason B Bryan
(74) *Attorney, Agent, or Firm* — Robert C. Kowert; Meyertons, Hood, Kivlin, Kowert & Goetzel, P.C.

(57) ABSTRACT

A log-structured distributed storage system may implement individual write quorums. Log records may be sent to different storage nodes of a quorum set storing data for a storage client sufficient to satisfy a write quorum requirement. For each log record, acknowledgments from storage nodes are received, and a determination is made whether the write quorum requirement is satisfied for the log record. Different log records may be maintained at different storage nodes, and still satisfy the write quorum requirement such that in some embodiments no one storage node may maintain all of the log records sent to storage nodes in the quorum set.

20 Claims, 13 Drawing Sheets

(58) Field of Classification Search
CPC ............ G06F 11/0709; G06F 11/1402; G06F 2201/80; H04L 67/1095
See application file for complete search history.

(56) References Cited

U.S. PATENT DOCUMENTS

| | | | |
|---|---|---|---|
| 5,471,614 | A | 11/1995 | Kakimoto |
| 5,524,205 | A | 6/1996 | Lomet et al. |
| 5,530,850 | A | 6/1996 | Ford et al. |
| 5,870,758 | A | 2/1999 | Bamford et al. |
| 5,907,848 | A | 5/1999 | Zaiken et al. |
| 5,951,695 | A | 9/1999 | Kolovson |
| 6,041,423 | A | 3/2000 | Tsukerman |
| 6,233,585 | B1 | 5/2001 | Gupta et al. |
| 6,240,413 | B1 | 5/2001 | Learmont |
| 6,615,219 | B1 | 9/2003 | Bruso et al. |
| 6,631,374 | B1 | 10/2003 | Klein et al. |
| 6,732,124 | B1 | 5/2004 | Koseki et al. |
| 6,732,171 | B2 | 5/2004 | Hayden |
| 6,832,229 | B2 | 12/2004 | Reed |
| 6,976,022 | B2 | 12/2005 | Vemuri et al. |
| 7,010,645 | B2 | 3/2006 | Hetzler et al. |
| 7,089,253 | B2 | 8/2006 | Hinshaw et al. |
| 7,146,386 | B2 | 12/2006 | Xiao |
| 7,287,034 | B2 | 10/2007 | Wong et al. |
| 7,305,386 | B2 | 12/2007 | Hinshaw et al. |
| 7,308,456 | B2 | 12/2007 | Friske et al. |
| 7,328,226 | B1 | 2/2008 | Karr et al. |
| 7,499,954 | B2 * | 3/2009 | Cherkauer .......... G06F 11/1662 |
| 7,716,645 | B2 | 5/2010 | Dolby et al. |
| 7,747,663 | B2 | 6/2010 | Atkin et al. |
| 7,885,922 | B2 | 2/2011 | Pareek et al. |
| 7,930,271 | B2 | 4/2011 | Tarbell |
| 7,937,551 | B2 | 5/2011 | Schott |
| 7,979,670 | B2 | 7/2011 | Saliba et al. |
| 8,086,650 | B1 | 12/2011 | Milford |
| 8,209,515 | B2 | 6/2012 | Schott |
| 8,255,627 | B2 | 8/2012 | Blinick et al. |
| 8,266,114 | B2 | 9/2012 | Mace et al. |
| 8,271,830 | B2 | 9/2012 | Erofeev |
| 8,289,801 | B2 | 10/2012 | Smith et al. |
| 8,301,670 | B2 | 10/2012 | Revah et al. |
| 8,326,897 | B2 | 12/2012 | Butterworth et al. |
| 8,341,128 | B1 | 12/2012 | Ruggiero |
| 8,370,715 | B2 | 2/2013 | Hafner et al. |
| 8,380,670 | B2 | 2/2013 | Kuber et al. |
| 8,392,479 | B1 | 3/2013 | Pantin |
| 8,396,831 | B2 | 3/2013 | Larson et al. |
| 8,412,689 | B2 | 4/2013 | Reid et al. |
| 8,412,752 | B2 | 4/2013 | Dodge |
| 8,429,121 | B2 | 4/2013 | Pareek et al. |
| 8,793,527 | B1 * | 7/2014 | Franks ................. G06F 3/067 709/219 |
| 2002/0107835 | A1 | 8/2002 | Coram et al. |
| 2002/0143733 | A1 | 10/2002 | Mukkamalla et al. |
| 2004/0133622 | A1 | 7/2004 | Clubb et al. |
| 2004/0225696 | A1 | 11/2004 | Wong et al. |
| 2004/0249869 | A1 | 12/2004 | Oksanen |
| 2004/0260972 | A1 * | 12/2004 | Ji ...................... G06F 11/2066 714/11 |
| 2006/0020634 | A1 | 1/2006 | Huras et al. |
| 2006/0047626 | A1 | 3/2006 | Raheem |
| 2006/0224636 | A1 | 10/2006 | Kathuria et al. |
| 2006/0253504 | A1 * | 11/2006 | Lee .................. G06F 17/30578 |
| 2007/0083570 | A1 | 4/2007 | Fineberg |
| 2007/0174541 | A1 | 7/2007 | Chandrasekaran et al. |
| 2008/0010322 | A1 | 1/2008 | Lee et al. |
| 2008/0183973 | A1 | 7/2008 | Aguilera et al. |
| 2008/0288646 | A1 * | 11/2008 | Hasha ................ H04L 67/1095 709/228 |
| 2008/0294648 | A1 | 11/2008 | Lin et al. |
| 2009/0249001 | A1 | 10/2009 | Narayanan et al. |
| 2010/0036861 | A1 | 2/2010 | Srihari et al. |
| 2010/0050172 | A1 | 2/2010 | Ferris |
| 2010/0192131 | A1 | 7/2010 | Dolby et al. |
| 2011/0035548 | A1 | 2/2011 | Kimmel et al. |
| 2011/0060724 | A1 | 3/2011 | Chan |
| 2011/0072217 | A1 | 3/2011 | Hoang et al. |
| 2011/0161496 | A1 | 6/2011 | Nicklin |
| 2011/0251997 | A1 | 10/2011 | Wang et al. |
| 2012/0005196 | A1 | 1/2012 | Horii |
| 2012/0011106 | A1 | 1/2012 | Reid et al. |
| 2012/0041899 | A1 | 2/2012 | Greene et al. |
| 2012/0166390 | A1 | 6/2012 | Merriman et al. |
| 2012/0174112 | A1 | 7/2012 | Vaidya et al. |
| 2012/0191648 | A1 | 7/2012 | Kuber et al. |
| 2012/0259889 | A1 | 10/2012 | Dinker et al. |
| 2012/0297073 | A1 | 11/2012 | Glover et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2012/0323849 | A1 | 12/2012 | Garin, Jr. et al. |
| 2013/0036281 | A1 | 2/2013 | Revah et al. |
| 2013/0042056 | A1 | 2/2013 | Shats et al. |
| 2013/0042156 | A1 | 2/2013 | Srinivasan et al. |
| 2013/0080386 | A1 | 3/2013 | Dwyer et al. |
| 2013/0080388 | A1 | 3/2013 | Dwyer et al. |
| 2013/0086129 | A1 | 4/2013 | Brown et al. |
| 2014/0040206 | A1 * | 2/2014 | Ramakrishnan .... G06F 11/2097 707/640 |

FOREIGN PATENT DOCUMENTS

| | | |
|---|---|---|
| EP | 1630674 | 3/2006 |
| JP | H10-254748 | 9/1998 |
| JP | 2000057032 | 2/2000 |
| JP | 2000259474 | 9/2000 |
| JP | 2005276094 | 10/2005 |
| JP | 2007200182 | 8/2007 |
| JP | 2007317017 | 12/2007 |
| JP | 2008003932 | 1/2008 |
| JP | 2012014502 | 1/2012 |
| JP | 2012507072 | 3/2012 |

OTHER PUBLICATIONS

"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27
Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11 g-SQL -Query-Result-Set-Caching.htm, pp. 1-7.
"Oracle Database JDBC Developers Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff "Bloom Filters for DBAs" published Aug. 28,2012, downloaded from http://juliandontcheff.wordpress.com/2012/08/28/bloom-filters-for-dbas/ on May 14, 2013, pp. 1-4
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
U.S. Appl. No. 61/794,572, filed Mar. 15, 2013, Anurag Windlass Gupta, et al.
U.S. Appl. No. 61/799,609, filed Mar. 15, 2013, Anurag Windlass Gupta, et al.
U.S. Appl. No. 61/794,612, filed Mar. 15, 2013, Pradeep Jnana Madhavarapu et al.

(56) References Cited

OTHER PUBLICATIONS

U.S. Appl. No. 61/794,658, filed Mar. 15, 2013, Anurag Windlass Gupta, et al.
U.S. Appl. No. 61/799,632, filed Mar. 15, 2013, Anurag Windlass Gupta, et al.
U.S. Appl. No. 13/892,027, filed May 10, 2013, Anurag Windlass Gupta, et al.
U.S. Appl. No. 13/873,467, filed Apr. 30, 2013, Anurag Windlass Gupta, et al.
U.S. Appl. No. 13/902,381, filed May 24, 2013, Anurag Windlass Gupta, et al.
U.S. Appl. No. 13/893,004, filed May 13, 2013, Laurion Darrell Burchall et al.
U.S. Appl. No. 13/901,111, filed May 23, 2013, Anurag Windlass Gupta, et al.
U.S. Appl. No. 13/894,969, filed May 15, 2013, Grant Alexander MacDonald McAlister et al.
U.S. Appl. No. 13/903,674, filed May 28, 2013, Anurag Windlass Gupta, et al.
U.S. Appl. No. 14/033,343, filed Sep. 20, 2013, Tengiz Kharatishvili et al.
U.S. Appl. No. 14/032,721, filed Sep. 20, 2013, Tengiz Kharatishvili et al.
U.S. Appl. No. 14/032,797, filed Sep. 20, 2013, Pradeep Jnana Madhavarapu et al.
U.S. Appl. No. 14/036,783, filed Sep. 25, 2013, Anurag Windlass Gupta, et al.
U.S. Appl. No. 14/032,763, filed Sep. 20, 2013, Yan Valerie Leshinsky et al.
U.S. Appl. No. 14/032,681, filed Sep. 20, 2013, Samuel James McKelvie, et al.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
Jim Gray, et al., "Transaction Processing: Concepts and Techniques—Chapter 10", In: "The Morgan Kaufmann Series in data management systems", Jan. 1, 1993, pp. 529-582.
Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.
Hector Garcia-Molina, et al., "Database Systems—The Complete Book Second Edition—Chapter 18 Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.
Neeta Garimella, "Understanding and exploiting snapshot technology for data protection, Part 1: Snapshot technology overview", IBM developerWorks, Apr. 26, 2006, Retrieved from URL: https://web.archive.org/web/20070125115155/http://www-128.ibm.com/developerworks/tivoli/library/t-snaptsm1/index.html, pp. 1-7.

* cited by examiner

INDIVIDUAL WRITE QUORUMS FOR A LOG-STRUCTURED DISTRIBUTED STORAGE SYSTEM

BACKGROUND

Data storage systems have implemented many different storage schemes for efficiently and reliability persisting data. Storage schemes implemented on a distributed system architecture are often deployed when storage system client applications, such as database systems, require greater availability of the data persisted in the data storage system. Common solutions to making data available including storing one or more copies or replicas of data on multiple storage nodes. However, by increasing the number of copies or replicas, the complexity and operational costs for maintaining a consistent and durable version of data increases. Durability requirements for distributed storage systems, for example, may increase the latency of performing updates or changes to data stored for storage system client applications by requiring that each of the copies complete the requested updates or changes. Such requirements impede the performance of the updates or changes for storage system client applications when accessing data at the distribute storage systems, leading to greater inefficiencies for storage system client applications performing frequent updates or changes.

Figure 1A:
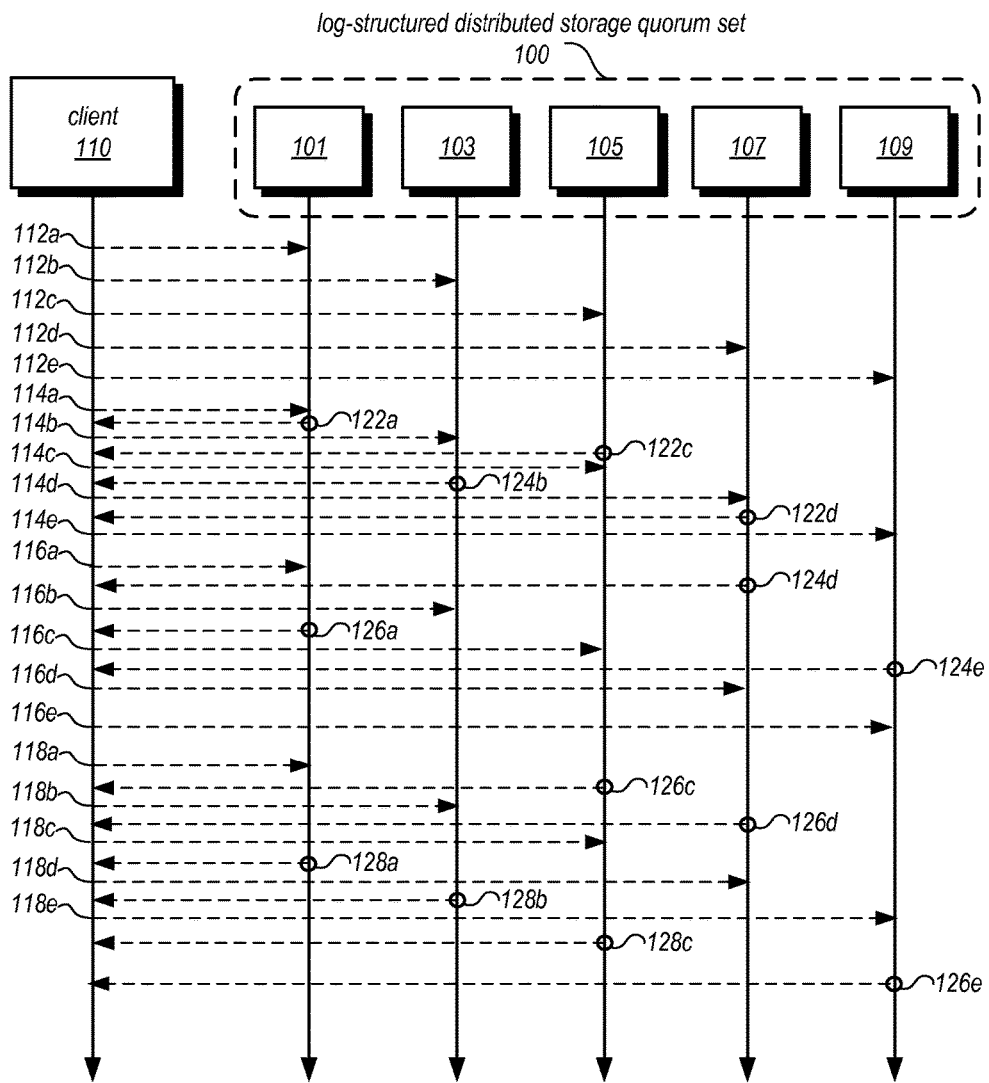
FIGS. 1A and 1B are block diagrams illustrating individual write quorums for a log-structured distributed storage system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of individual quorum writes for log-structured distributed storage systems are described herein. Distributed storage systems may maintain multiple copies or versions of data in order to increase availability for storage clients to access the data. For a log-structured distributed storage system, storage nodes (or other distributed components of the storage system) of the distributed storage system may each implement their own version of a log-structured data store that stores data for storage clients. Groups of these storage nodes may form quorum sets (sometimes referred to as protection groups) that durably maintain write requests that have been performed or complete at the respective log-structured data stores. These write requests may include the performance of updates or storing of log records and may be written to the log-structured data stores maintained among different storage nodes according to a durability policy known as a write quorum requirement. For example, if a quorum set of 5 storage nodes maintains a log-structured data store for storage clients, then log record updates may need to be persisted at a minimum number of storage nodes (e.g., 3) in order for the log record to be considered durable. In various embodiments, storage nodes that acknowledge completion of a write request to satisfy a write quorum requirement may be different from one or more storage nodes completing the write request in satisfaction of the write quorum requirement for another write request. In this way, the workload of individual storage nodes in the quorum set may be balanced or more evenly distributed, reducing congestion and latency for completing write requests. Moreover, by performing the write requests according to the write quorum requirement in a log-structured storage environment, even though an individual storage node may not have completed all of the write requests sent to the quorum set (e.g., maintain all of the log records), collectively the completion of the writes across the quorum set may be sufficient to ascertain the entire log. Thus, dependencies among log records in the log-structure data stores may be maintained, even if the dependencies are not maintained at a single storage node location.

Typical distributed storage systems may implement write quorum requirements for performing writes at different storage nodes of a quorum set. However, these storage systems often require that each acknowledgment of a write (e.g., log record) may indicate that the storage node has performed the requested write and every other write prior to the requested write in order to ensure that dependencies among log records are maintained. For instance, in typical distributed storage system implementing a log-structured data store, the acknowledgment from each storage node satisfying the write quorum requirement would indicate that each storage node of the write quorum has received every log record prior to the log record, as well as the log record itself. Such implementations may increase latency for performing write operations at different storage nodes in a distributed storage system, as each storage node may not be able to acknowledge a write until it has received and stored every prior write. Moreover, failure to complete a write at a storage node may render the storage node unavailable to continue satisfying write quorums (at least until some kind of repair action is taken).

Figure 1B:
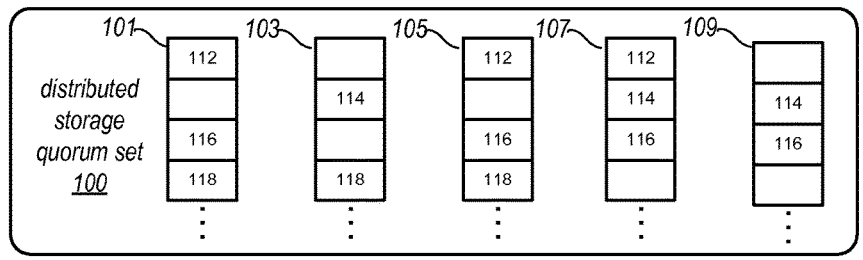

FIGS. 1A and 1B illustrate an example of individual write quorums for a log-structured, distributed storage system, according to some embodiments. A log-structured distributed storage system may store data on behalf of storage clients, such as client 110. Storage clients may be any type of system, device, or application, such as the database service described below with regard to FIGS. 2-7, that may utilize distributed log structured storage for storing client data. In some embodiments, a client-side driver, or other type of module or interface may be implemented on client 110 to interface with the log-structured distributed storage system, such as client-side storage service driver 425 discussed below with regard to FIG. Log-structured distributed storage system may implement a set of storage nodes accessible to client 110 in order to provide access to data stored for client 110, such as various read and write requests. The set of storage nodes may be a log-structured distributed storage quorum set 100. Log-structured distributed storage quorum set 100 may be implemented by multiple servers, nodes, instances, or any other type of computing device, such as computing device 1200 described below with regard to FIG. 12, that provide a log-structured data store for client 110. In FIG. 1, for example, storage nodes 101, 103, 105, 107, and 109, together implement a quorum set for client 110.

As noted above durability requirements may be implemented for changes or write requests made to data stored for client 110. A write quorum requirement may, in some embodiments, be enforced such that each write is completed at storage nodes in satisfaction of the write quorum requirement. A write quorum requirement may in some embodiments require a minimum number of storage nodes and/or locations of storage nodes (e.g., in a particular data center, or availability zone) that maintain a log record in order for the log record to be made durable at the protection group. Satisfaction of a write quorum requirement for an individual write request may be determined by client 110, in some embodiments.

FIG. 1A illustrates a time series of write requests sent from client 110 to different storage nodes in log-structured distributed storage quorum set 100. In order for client 110 to determine that a write request has been completed at storage nodes sufficient to satisfy a write quorum (which in this example is ⅗ storage nodes), acknowledgments of write requests may be sent in return to write requests. Each write request may, in some embodiments, include a log record to be persisted as part of the log-structured data store implemented on the storage node. For example, write request 112 may be sent to each storage node of quorum set 100, as illustrated at 112a, 112b, 112c, 112d, and 112e respectively. Only some of the storage nodes may acknowledge the write request. For example storage node 101 may acknowledge write request 112a as illustrated at 122a, send back an acknowledgement to client 110. Likewise storage nodes 105 and 107 may acknowledge the write requests at 122c and 122d respectively. Client 110 may then determine that write request 112 is durable when it receives acknowledgement 122d. Please note, write requests may be performed between client 110 and quorum set 100 asynchronously. For instance, write request 114 may be sent out to some quorum set members, such as illustrated at 114a, before write request 112 has been determined to satisfy the write quorum requirement at 122d.

Some write requests sent may not be acknowledged back from storage nodes. This may be due to various factors, such as network or other communication problems that prevent the request reaching the storage node, or congestion or other workload at the storage node itself which may prevent the storage node from processing and/or acknowledging the write request. For example, write request 112e is not responded to by storage node 109. Similarly, write requests 114a, 112b, 114c, 116b, 118d, and 118e, are not acknowledged by their respective storage nodes. However, as noted above, congestion or other factors preventing acknowledgment may ease allowing for one or more of these storage nodes to acknowledge at a later time, although this is not illustrated in FIG. 1A.

Individual write quorums may be established for write requests by different storage nodes in the quorum set 100. For example, write request 114 may be sent 114b to storage node 103 and acknowledged 124b, as well as sent 114d and 114e, and acknowledged back at 124d and 124e respectively. Write 118 is sent 118a, 118b, and 118c to storage nodes 101, 103, and 105, and acknowledged 128a, 128b, and 128c respectively. Although not illustrated, some acknowledgments may be received from some storage nodes, but not enough to satisfy the write quorum requirement. Client 110 may wait for a period of time before resending the write request, or triggering some other repair or response operation. For example, in some embodiments, a new storage node may be added to the quorum set 100, with some write requests sent to the new storage node. As prior write requests may be completed at other storage nodes, the new storage node may not have to be immediately caught up with these prior writes in order to immediately assist in providing durability for the quorum set. Various background replication or synchronization processes, such as those discussed below with regard to FIG. 10, may be performed.

Other writes may be acknowledged by more than enough storage nodes to satisfy the write quorum requirement. Write request 116 may be sent 116a, 116c, and 116d to storage nodes 101, 105, and 107 with respective acknowledgments 126a, 126c, 126d, and 126e sent to client 110 that exceed the write quorum requirement.

Some write requests may be sent out of order (with respective to a log record sequence). For example, write request 112 may have log record with a log sequence number (LSN) prior to the LSN for the log record of write request 114. Yet, write request 114b may be sent and/or acknowledged 124b prior to receiving write acknowledgment 122d. Write requests may also, in some embodiments, be sent to storage nodes in batches, which may process and/or acknowledge them in different orders than they are sent, or received.

FIG. 1B illustrates the state of the log-structured data stores at each storage node upon completion of the requests and acknowledgments illustrated in FIG. 1A. Although each write request, 112, 114, 116, and 118, has satisfied a write quorum requirement, different storage nodes may maintain the log records in satisfaction of the write quorum requirement. Storage node 101, for example has completed write requests 112, 116, and 118. While storage node 103 has completed 114 and 118. Storage node 105 has completed 112, 116, and 118. Storage node 109 has completed write requests 114 and 116. If the log records from each of the completed writes across the storage nodes of quorum set 100 are merged together, the entire log record sequence may be generated with at least 3 copies of each log record maintained (per the write quorum requirement).

Figure 9:
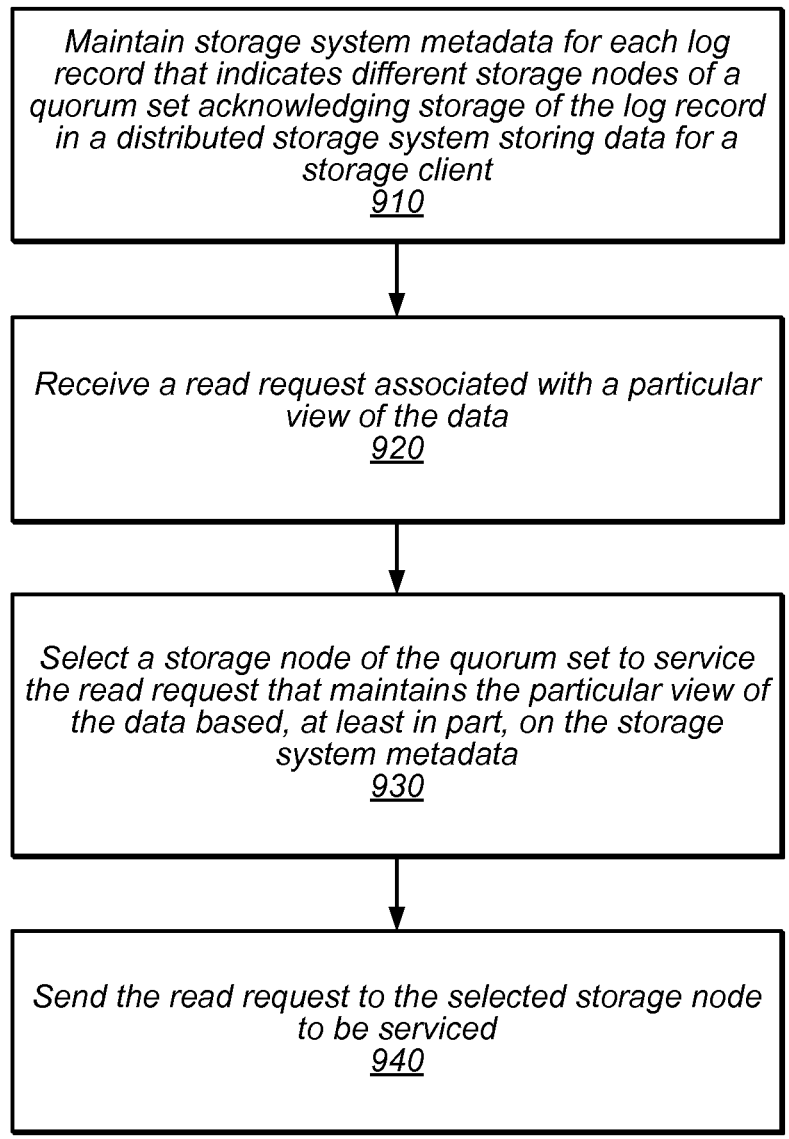
FIG. 9 is a high-level flowchart illustrating various methods and techniques to perform read requests in log-structured distributed storage system implementing individual write quorums, according to some embodiments.
Figure 10:
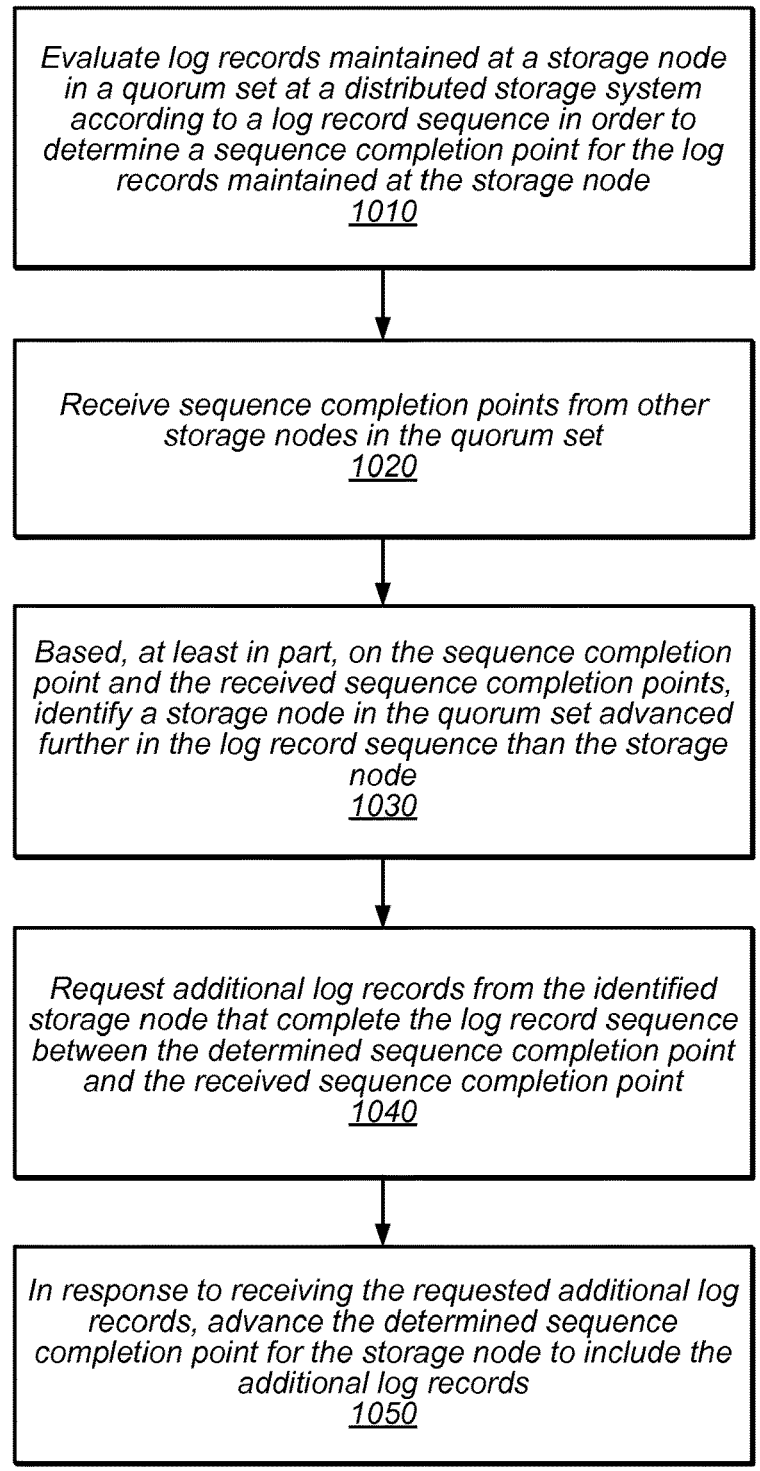
FIG. 10 is a high-level flowchart illustrating various methods and techniques for replicating log records among storage nodes in a quorum set implementing individual write quorums, according to some embodiments.
Figure 11:
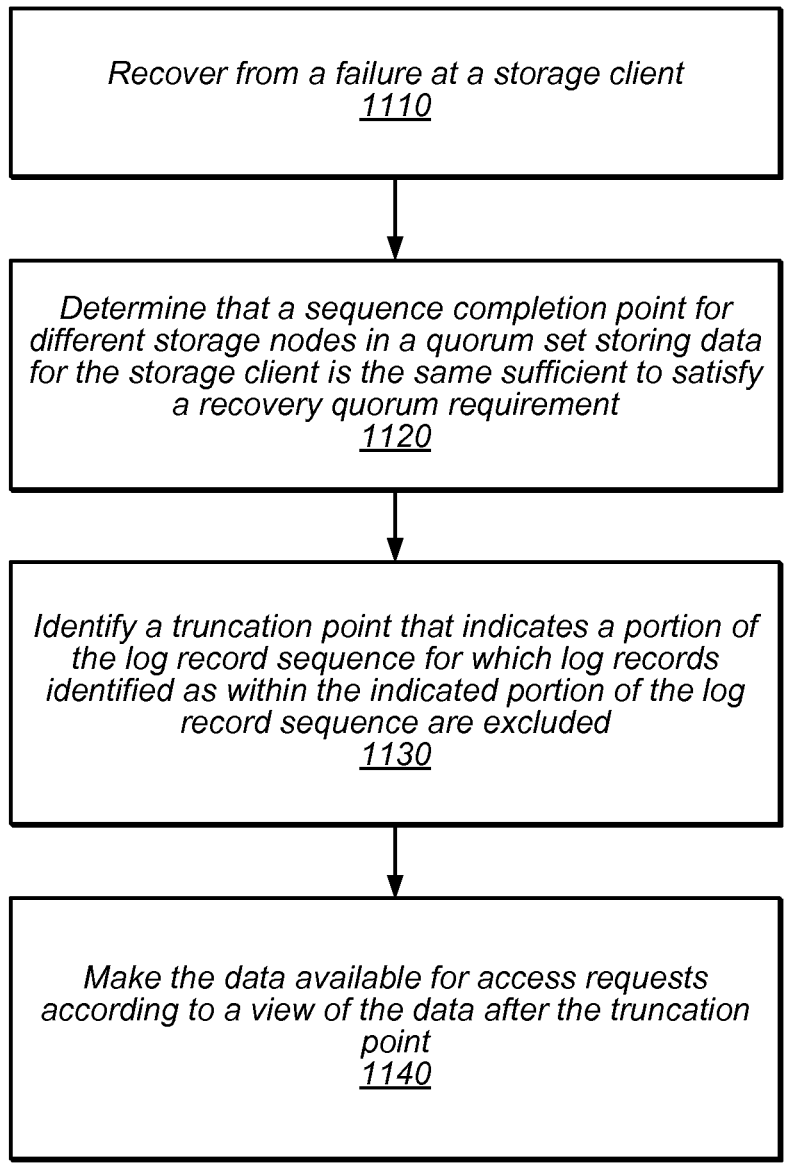
FIG. 11 is a high-level flowchart illustrating various methods and techniques for performing recovery of a storage client of a log-structured distributed storage system implementing individual write quorums, according to some embodiments.

Various different methods and techniques may be employed to interact with a quorum set maintaining individual write quorums for write requests. FIG. 9 illustrates various techniques with regard to performing a read request for a version of data, according to some embodiments. FIG. 10 illustrates various methods and techniques for replicating log records across the different storage nodes of the quorum set, according to some embodiments. FIG. 11 illustrates various techniques for recovering from a storage client failure, according to various embodiments, including ways to handle merge the log records from individual storage nodes to determine the durable and complete portion of the log for data stored at the quorum set.

Please note, FIGS. 1A and 1B are provided as examples of individual write quorums for a log-structured distributed storage system, and are not intended to be limiting as to the physical arrangement, size, or number of components, modules, or devices, implementing a log-structured distributed storage system, nor as to the timing, ordering, or any other arrangement for processing of write requests. For example, storage nodes that are a part of quorum set 100 may also maintain data as members for various other quorum sets. More or less group members may be included in a quorum set, as well as their distribution across a variety of different locations, such as different availability zones.

The specification first describes an example of a log-structured distributed storage system that may implement individual write quorums, according to various embodiments. The distributed storage service may store data for many different types of clients, in various embodiments. One such client may be a network-based database service, described in further detail below. Included in the description of the example network-based database service are various aspects of the example network-based database service along with the various interactions between the database service and the distributed storage service. The specification then describes a flowchart of various embodiments of methods for implementing individual write quorums for log-structured distributed storage systems. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group (or quorum set). In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
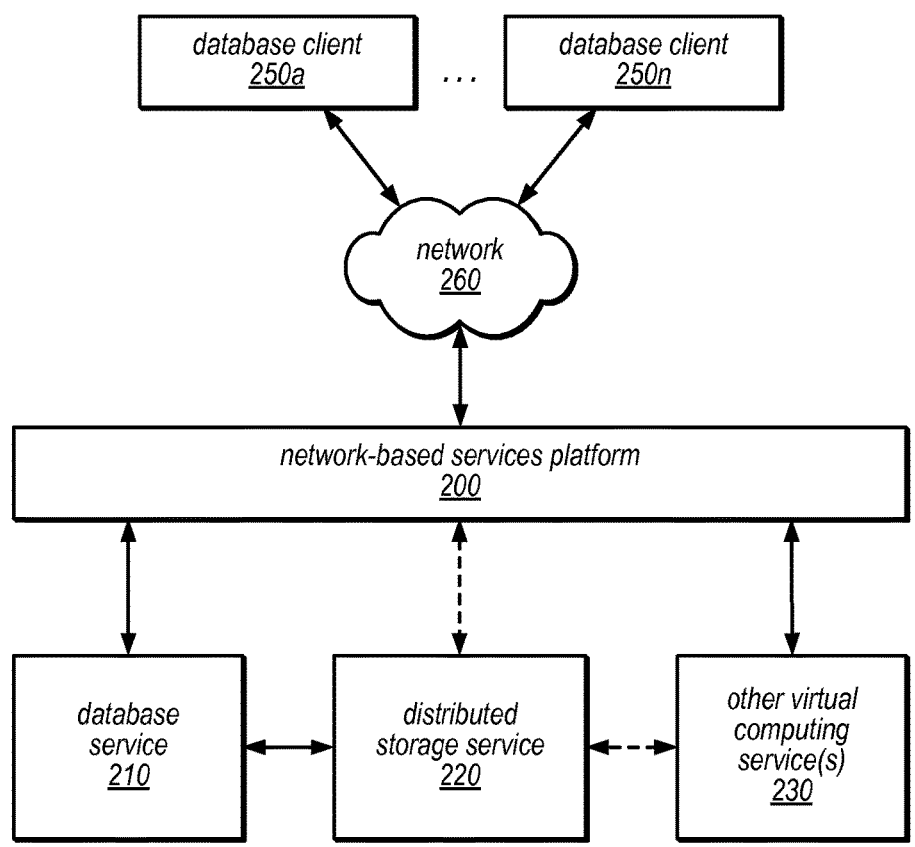
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. For example, a data archive service may be implemented to archive data from distributed storage service 220, which may then be used to recover from failures at distributed storage service 220. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250*a* through 250*n*, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
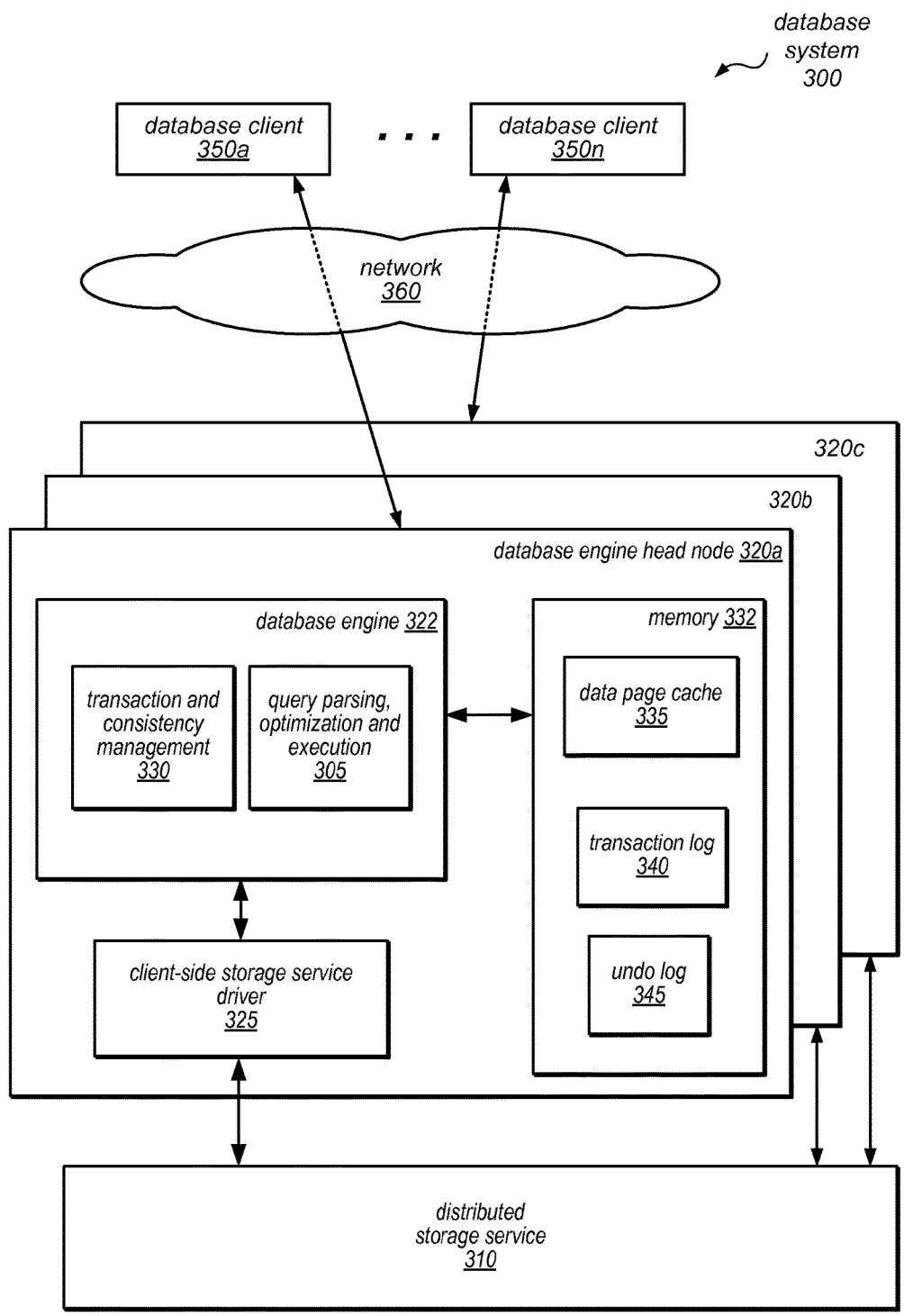
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350*a*-350*n*). As illustrated in this example, one or more of database clients 350*a*-350*n* may access a database head node 320 (e.g., head node 320*a*, head node 320*b*, or head node 320*c*, each of which is a component of a respective database instance) via network 360 (e.g., these components may be network-addressable and accessible to the database clients 350*a*-350*n*). However, distributed storage service 310, which may be employed by the database system to store data pages of one or more databases (and redo log records and/or other metadata associated therewith) on behalf of database clients 350*a*-350*n*, and to perform other functions of the database system as described herein, may or may not be network-addressable and accessible to the storage clients 350*a*-350*n*, in different embodiments. For example, in some embodiments, distributed storage service 310 may perform various storage, access, change logging, recovery, log record manipulation, and/or space management operations in a manner that is invisible to storage clients 350*a*-350*n*.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320*a* may perform these functions for queries that are received from database client 350*a* and that target the database instance of which database engine head node 320*a* is a component. In some embodiments, query parsing, optimization, and execution component 305 may return query responses to database client 350*a*, which may include write acknowledgements, requested data pages (or portions thereof), error messages, and or other responses, as appropriate. As illustrated in this example, database engine head node 320*a* may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350*a*).

In this example, database engine head node 320*a* includes a data page cache 335, in which data pages that were recently accessed may be temporarily held. As illustrated in FIG. 3, database engine head node 320*a* may also include a transaction and consistency management component 330, which may be responsible for providing transactionality and consistency in the database instance of which database engine head node 320*a* is a component. For example, this component may be responsible for ensuring the Atomicity, Consistency, and Isolation properties of the database instance and the transactions that are directed that the database instance. As illustrated in FIG. 3, database engine head node 320*a* may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320*b* and 320*c*) may include similar components and may perform similar functions for queries received by one or more of database clients 350*a*-350*n* and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores.

As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
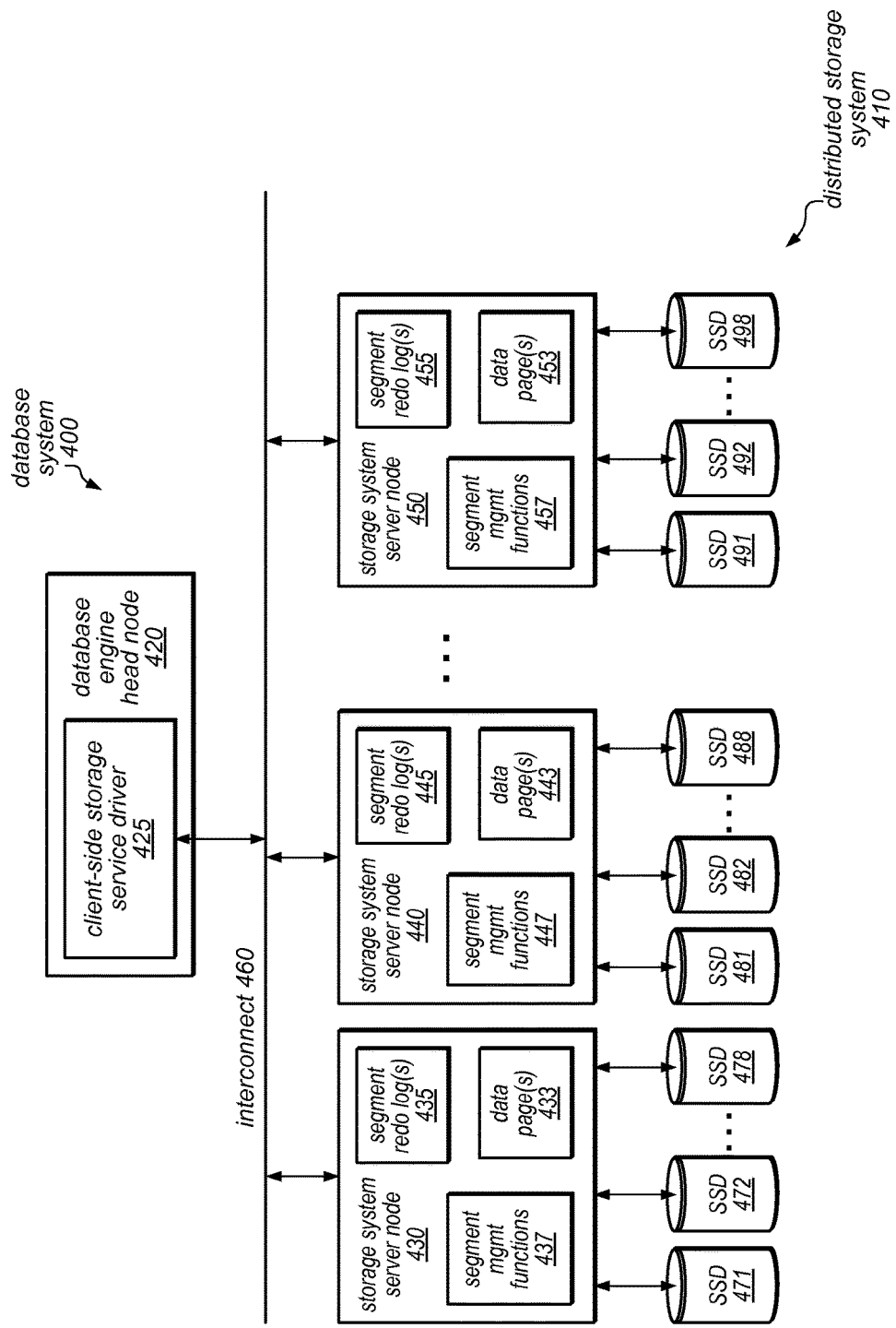
FIG. 4 is a block diagram illustrating a distributed storage system, according to some embodiments.

One embodiment of a distributed storage system is illustrated by the block diagram in FIG. 4. In at least some embodiments, storage nodes 430-450 may store data for different as part of a multi-tenant storage service. For example, the various segments discussed above and below with regard to FIG. 7, may correspond to different protection groups (or quorum sets) and volumes for different clients. As noted above, some storage nodes may perform garbage collection independent from other storage nodes. Consider the scenario where a storage node maintains data for two different clients. One client's data may be actively accessed/modified, causing the log structure for that data to grow quickly. Though, the other data maintained for the other client may be accessed infrequently, garbage collection may be performed to reclaim log pages associated with the other data in order to make more data pages available for the more active log.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node or quorum set), coalescing of redo logs to generate data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system may also implement a storage control plane. Storage control plane may be one or more compute nodes configured to perform a variety of different storage system management functions. For example, storage control plane may implement a volume manager, which may be configured to maintain mapping information for a volume as it is persisted in varying different, extents, segments, and protection groups. A volume manager may be configured to communicate with a client of storage system, such as client-side driver 425 in order to "mount" the volume for the client, providing client-side driver 425 with mapping information, protection group policies, and various other information necessary to send write and read requests to storage nodes 430-450. Storage control plane may also implement a membership management module. Membership management module may be configured to provide dynamic membership changes for group members of a protection group/quorum set. In at least some embodiments, membership management module may be configured to direct membership changes such that client-side driver 425 is unaware of the need for the protection group membership change.

Figure 5A:
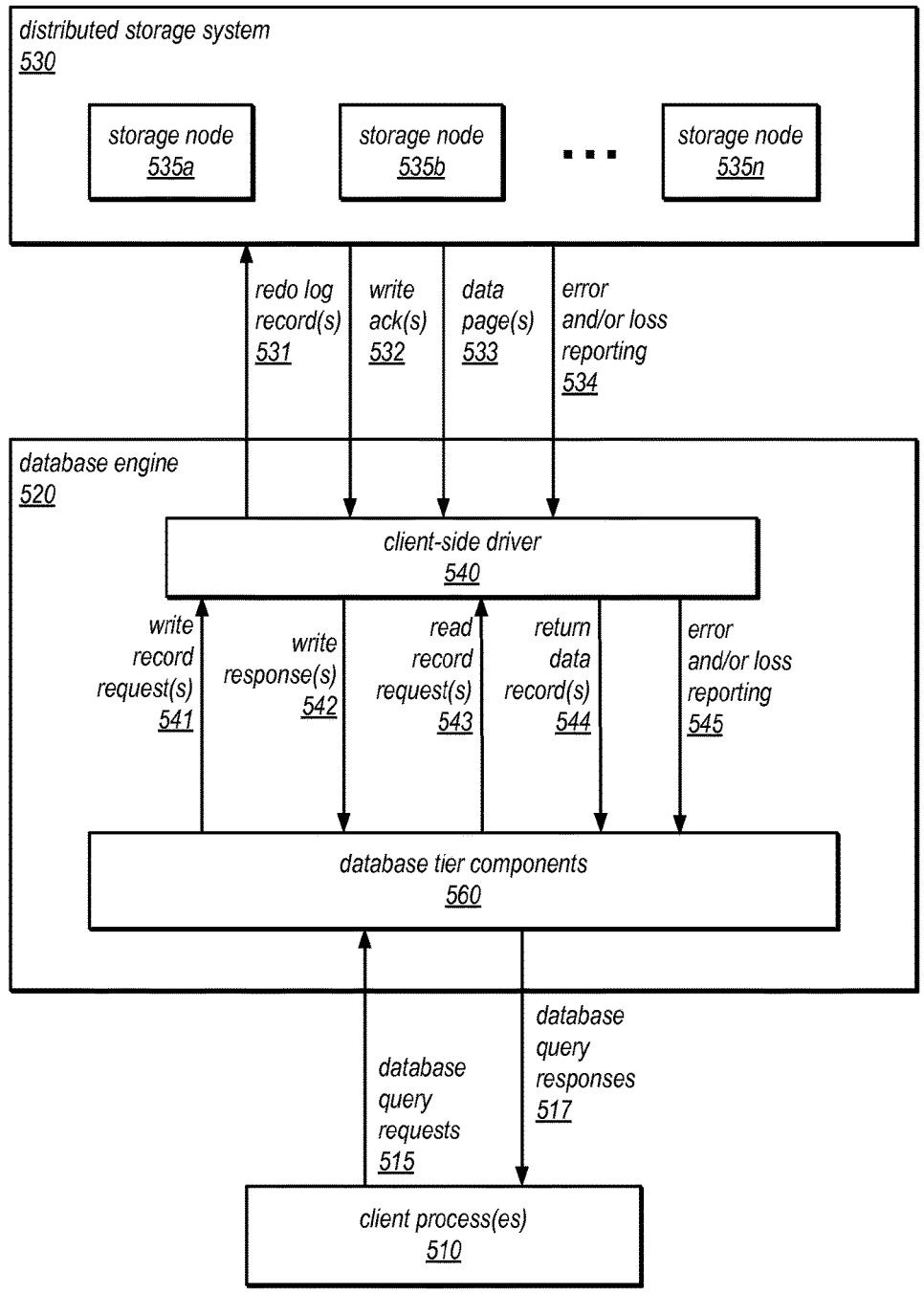
FIGS. 5A and 5B are block diagrams illustrating the use of a separate distributed storage system in a database system, according to some embodiments.

FIG. 5A is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Figure 5B:
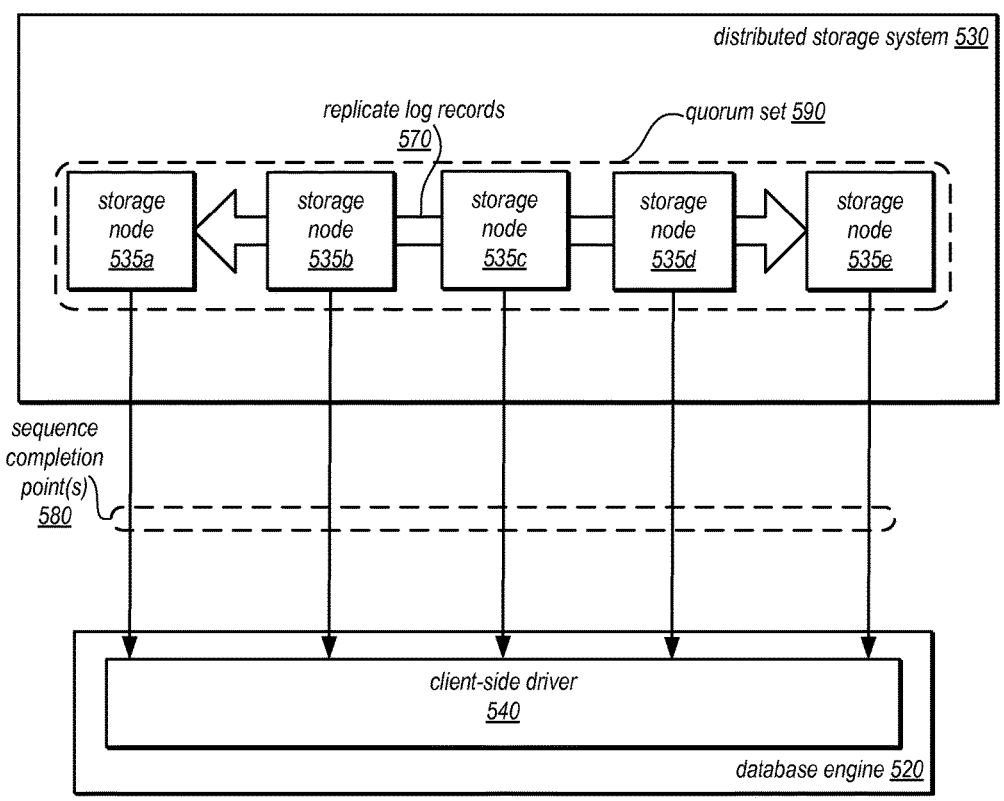

FIG. 5B illustrates various interactions between storage nodes of a quorum set 590 in distributed storage system 530. For example, quorum set 590 may be implemented from storage nodes 535, such as storage node 535a, 535b, 535c, 535d, and 535e. As discussed above with regard to FIG. 1A, individual write quorums may be implemented from different storage nodes in quorum set 590. Redo log records 531 sent to different storage nodes in quorum set 590 may be durably maintained on certain storage nodes, and not others. In various embodiments, storage nodes 535 may synchronize, or replicate log records 570 among the members of quorum set 590, in order to allow each storage node to eventually maintain the same or similar version of data for database engine 520. FIG. 10 illustrates various methods and techniques which may be employed by storage nodes 535 in quorum set 590. For example, each storage node may evaluate the log records maintained at that storage node in order to determine a sequence completion point for the storage node according to the log record sequence for log records (e.g., the LSN number space). These sequence completion points 580 may also be sent to client-side driver 540 in order to perform various recovery techniques for database engine 520, or to otherwise determine the completion point for the log as maintained across the entire quorum set 590. Based, on the sequence completion points, storage nodes, such as storage node 535a may identify another storage node that is further advanced in the log record sequence, such as 535b, and request log records from 535b to complete the log record sequence at 535 up to the sequence completion point at 535b. This replication process may be performed amongst the storage nodes of quorum set 590, in the background, while still processing and responding to the various requests illustrated in FIG. 5A.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
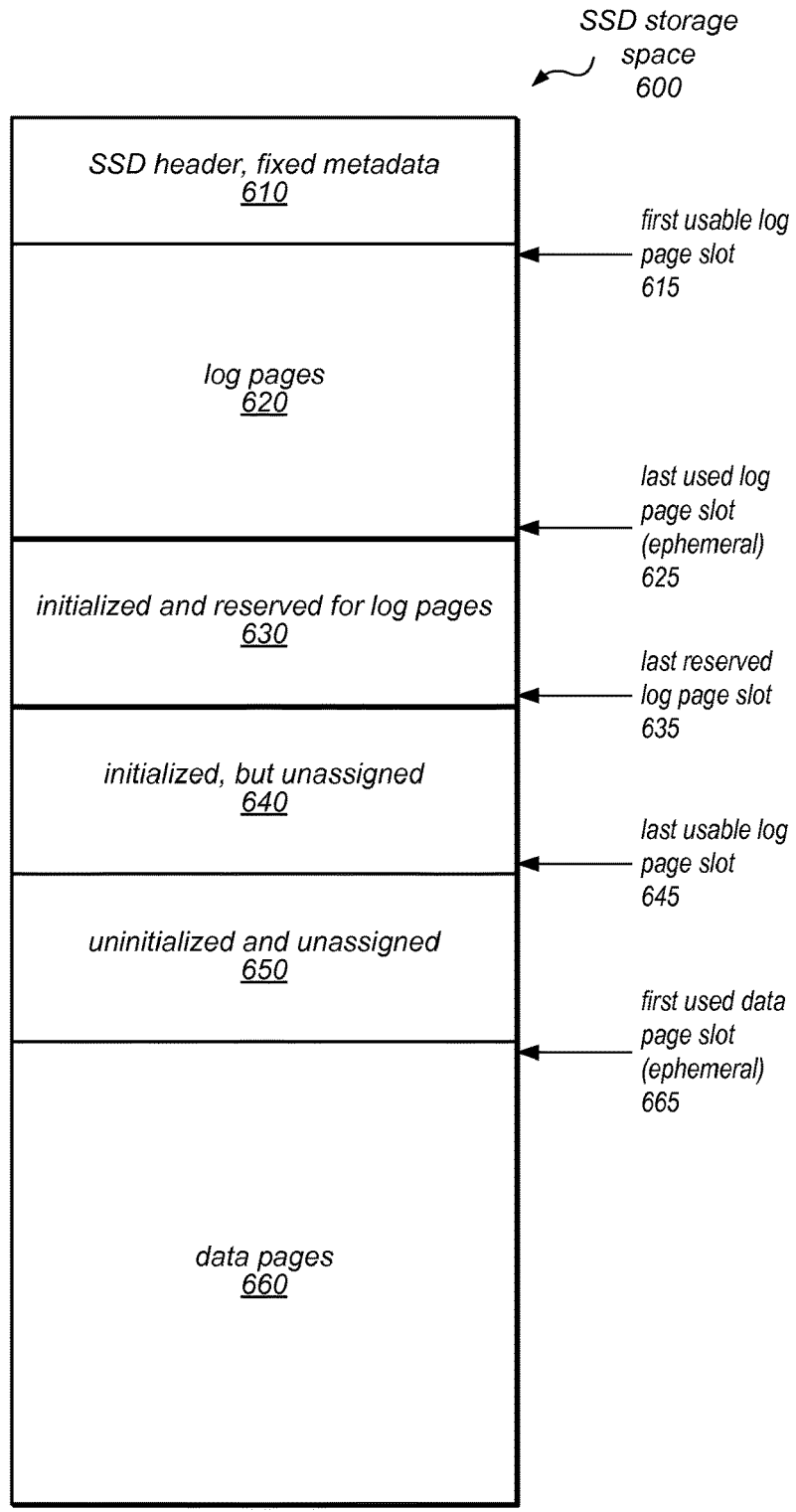
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages.

In this example, the first usable log page slot is noted as 615, and the last used log page slot (ephemeral) is noted as 625. The last reserved log page slot is noted as 635, and the last usable log page slot is noted as 645. In this example, the first used data page slot (ephemeral) is noted as 665. In some embodiments, the positions of each of these elements (615, 625, 635, 645, and 665) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot (at 615) and the last reserved log page slot (625). In some embodiments, this pool may safely grow up to last usable log page slot (625) without re-initialization of new log page slots (e.g., by persisting an update to the pointer that identifies the last reserved log page slot, 635). In this example, beyond the last usable log page slot (which is identified by pointer 645), the pool may grow up to the first used data page slot (which is identified by pointer 665) by persisting initialized log page slots and persistently updating the pointer for the last usable log page slot (645). In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot (635).

In the example illustrated in FIG. 6, the current data page slot pool includes the area between the last usable log page slot (which is identified by pointer 645) and the end of SSD storage space 600. In some embodiments, the data page pool may be safely grown to the position identified by the pointer to the last reserved log page slot (635) by persisting an update to the pointer to the last usable log page slot (645). In this example, the previously initialized, but unassigned portion of the SSD storage space 600 shown as 640 may be pressed into service to store data pages. Beyond this, the pool may be safely grown to the position identified by the pointer to the last used log page slot (625) by persisting updates to the pointers for the last reserved log page slot (635) and the last usable log page slot (645), effectively reassigning the portions of SSD storage space 600 shown as 630 and 640 to store data pages, rather than log pages. In some embodiments, the data page slot pool may be safely shrunk down to the position identified by the pointer to the first used data page slot (665) by initializing additional log page slots and persisting an update to the pointer to the last usable log page slot (645).

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot (635) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and may preferentially garbage collect almost-empty data pages (which may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 7:
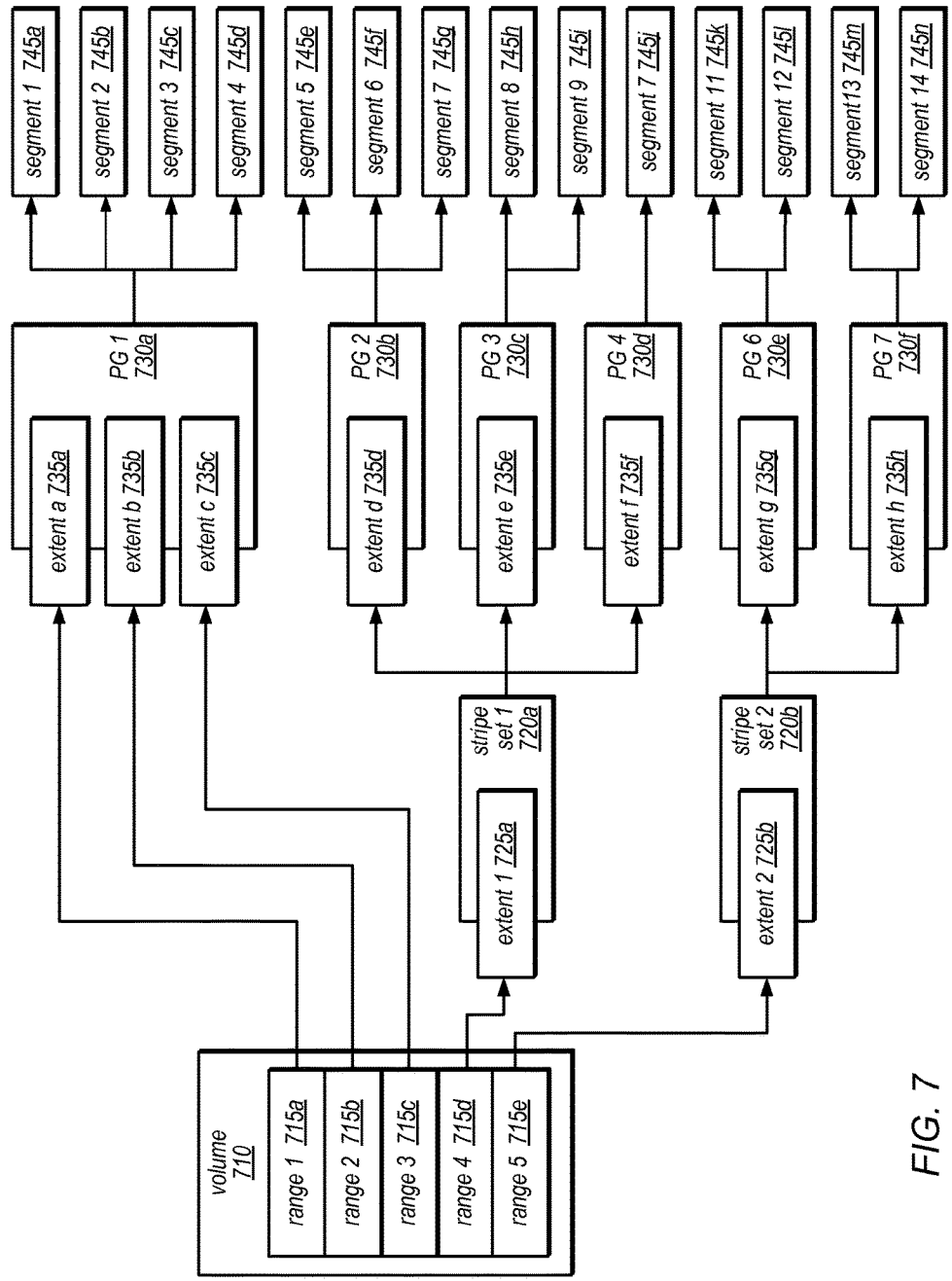
FIG. 7 is a block diagram illustrating an example configuration of a database volume, according to some embodiments.

FIG. 7 is a block diagram illustrating an example configuration of a database volume 710, according to one embodiment. In this example, data corresponding to each of various address ranges 715 (shown as address ranges 715a-715e) is stored as different segments 745 (shown as segments 745a-745n). More specifically, data corresponding to each of various address ranges 715 may be organized into different extents (shown as extents 725a-725b, and extents 735a-735h), and various ones of these extents may be included in different protection groups 730 (shown as 730a-730f), with or without striping (such as that shown as stripe set 720a and stripe set 720b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (720a) and stripe set 2 (720b) illustrates how extents (e.g., extents 725a and 725b) may be striped into a volume, in some embodiments.

More specifically, in this example, protection group 1 (730a) includes extents a-c (735a-735c), which include data from ranges 1-3 (715a-715c), respectively, and these extents are mapped to segments 1-4 (745a-745d). Protection group 2 (730b) includes extent d (735d), which includes data striped from range 4 (715d), and this extent is mapped to segments 5-7 (745e-745g). Similarly, protection group 3 (730c) includes extent e (735e), which includes data striped from range 4 (715d), and is mapped to segments 8-9 (745h-745i); and protection group 4 (730d) includes extent f (735f), which includes data striped from range 4 (715d), and is mapped to segment 10 (745j). In this example, protection group 6 (730e) includes extent g (735g), which includes data striped from range 5 (715e), and is mapped to segments 11-12 (745k-745l); and protection group 7 (730f) includes extent h (735h), which also includes data striped from range 5 (715e), and is mapped to segments 13-14 (745m-745n).

The distributed storage service and database service discussed in FIGS. 2 through 7 above represent some of the various different interactions between a database system and a log-structured distributed storage system implementing individual write quorums. FIGS. 8-11 discussed below provide further examples of the interactions between a database system, or any other type of storage client, application, system or device. The distributed storage system and storage clients may be configured similar to the distributed storage service and the database service discussed above, in some embodiments. While in other embodiments, storage system clients may be different client systems that may utilize a distributed storage system. For example, storage clients may provide data storage for a variety of different systems or applications that rely upon highly available log-structured data stores, such as providing block-based storage services, email services, e-commerce platforms, content-delivery networks, etc. However log-structured distributed storage systems and storage system clients are configured, the following discussion illustrates a distributed storage system implementing dynamic protection group membership changes, according to various embodiments.

As discussed above, with regard to FIGS. 1A, 1B, and 5A, a log-structured distributed storage system may group replicas, copies, or versions of data maintained at different storage nodes implementing a log-structured data store into a quorum set (sometimes referred to as a protection group). A log-structured data store may maintain both data and metadata about the data in a log that maintains chronologically-advancing versions of both data and/or the metadata. Each storage node in a quorum set may maintain its own respective log, and thus log records sent to a storage node may be maintained in the log at the storage node.

A quorum set may be implemented, in various embodiments, in order to ensure that the log is durably maintained. A write quorum requirement may in some embodiments require a minimum number of storage nodes and/or locations of storage nodes (e.g., in a particular data center, or availability zone) that maintain a log record in order for the log record to be made durable at the protection group. For example, if a quorum set has 5 storage nodes, the write quorum requirement for the storage nodes may be 3 storage nodes. Similarly, a read quorum requirement may ensure that a minimum number of storage nodes and/or locations of storage nodes may together maintain a complete log (e.g., if each of the log records maintained at the respective storage nodes of the read quorum were combined a complete set of log records may exist). Continuing with the example above, the read quorum requirement may be 2 storage nodes. Quorum requirements for distributed systems are well-known to those of ordinary skill I the art, and thus, the previous examples are not intended to be limiting.

Figure 8:
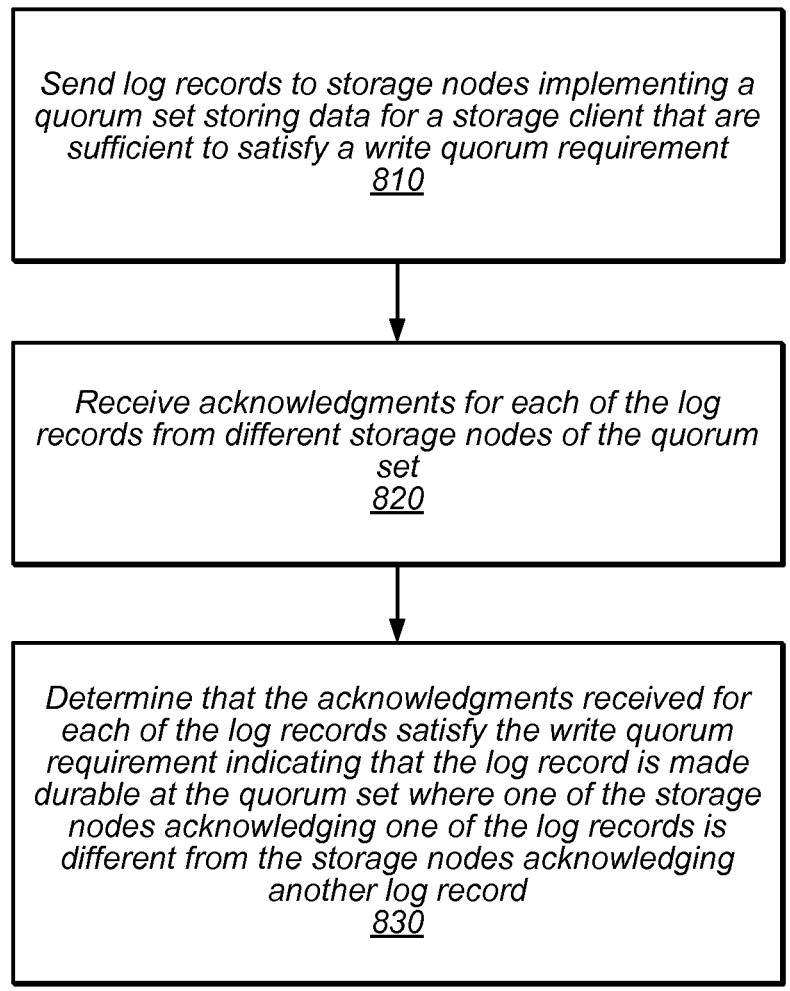
FIG. 8 is a high-level flowchart illustrating various methods and techniques to implement individual write quorums for a log-structured distributed storage system, according to some embodiments.

Storage clients, as discussed above, may be systems, applications, or devices that may be configured to access (write or read) data from the storage nodes of a quorum set. The database service above, for instance, may send redo log records to storage nodes of the quorum set to be written to logs maintained at the storage nodes of the quorum set. Likewise, read requests, may be sent by a storage client to storage nodes in order to obtain data for performing various operations at the storage client. In order to ensure that changes to data stored at a quorum set are durable, a storage client may ensure that durability requirements, such as write quorum requirements are enforced for each log record sent to the quorum set to be maintained. FIG. 8 is a high-level flowchart illustrating various methods and techniques to implement individual write quorums for a log-structured distributed storage system, according to some embodiments.

As indicated at 810, log records indicating update to data may be sent to storage nodes implementing a quorum set storing data for a storage client that are sufficient to satisfy a write quorum requirement for the log record, in various embodiments. For instance, if a write quorum requirement requires that ⅔ different storage nodes in 2 availability zones, A and B, maintain the log record, then the log record may be sent to at least two of the storage nodes in both availability zones. In at least some embodiments, the log record may be sent to all of the storage nodes in the quorum set. The log records may themselves be any type of log record indicating updates to the data for the storage client. In the database service examples described above with regard to FIGS. 2-7, redo log records (or one of the various other log records discussed above such as AULRs, DULRs, CLRs, etc. . . . ) may be sent to the quorum set. Other types of log records may include log records that include new data, or new versions of data, log records that describe changes to data relative to (or dependent on) other log records or versions of data, or various log records that describe metadata associated with the data. As numerous different types of log records may be implemented in a log-structured storage system, the previous examples are not intended to be limiting.

Storage nodes that receive and maintain the log records (e.g., append it the local version of the log, write the log record to a buffer to be persistently maintained, or otherwise store the log record in a durable storage location), may send an acknowledgment message indicating the log record that has been maintained (as well as which storage node is maintaining it). Note, that in some embodiments, the acknowledgment for a log record may be sent for that log record alone, without indicating whether any other log records in the log record sequence (e.g., such as one or more log records that come before the log record in the log record sequence) are maintained. Similarly, the acknowledgment for a log record may be sent for the log record without waiting on any other log record to be received at the storage node. For instance, as illustrated in FIG. 1A, different storage nodes may receive and maintain different log records, so a storage node may not receive (or may be unable to process due to workload or other factors such as missing messages due to dropped packets) every log record that is sent.

In some embodiments, acknowledgments for each log record may be received from different ones of the storage nodes implementing the quorum set, as indicated at 820. For example, as illustrated above in FIG. 1A, acknowledgments for log record 112 are received from storage nodes 101, 105, and 107. Acknowledgments may be received for the same log record at different times. For example, as illustrated in FIG. 1A, acknowledgment for write request 112 is received at different times, 122a, 122c, and 122d. Thus, in various embodiments acknowledgments may be received from storage nodes in a continuous fashion. In at least some embodiments, one or more storage nodes acknowledging a log record to satisfy a write requirement may be different from the storage nodes acknowledging another log record sent to the same quorum set. Again, FIG. 1A illustrates an example. Log record 114 is maintained at storage node 109, while log record 118 is maintained at storage node 105. Although log records may be dependent on one another, no one storage node in the quorum set may store all of the log records (although each may eventually come to store the same log records through a replication process, such as discussed below with regard to FIG. 10. In some embodiments, the membership of a quorum set may change, such as due to a failure of a storage node and/or the addition of a new storage node to the quorum set. In such cases, one of the new storage node may maintain more recent log records, but not older log records.

As indicated at 830, in at least some embodiments, acknowledgments received for each log record may be determined to satisfy the write quorum requirement indicating that the log record is made durable at the quorum set. For example, if the write quorum requirement is to maintain log records at ⅗ storage nodes in 2 different availability zones and ⅔ storage nodes in another availability zone, then the received acknowledgments may be evaluated to identify at least enough storage nodes in the 3 availability zones have maintained the log record. Determining whether a write quorum requirement is met for a particular log record may be performed at different times. For example, in some embodiments, a determination may be made when an acknowledgment for a log record is received. If the write quorum requirement is not met, then a storage client or other system, application or device implementing the method, may wait to receive another acknowledgment for the log record before making another determination as to whether the write quorum requirement is satisfied. Elements 810, 820 and 830 may be performed in continuous fashion, responding dynamically to new updates received for data stored in the log-structured storage system generating more log records to send, receiving acknowledgements for log records, and/or making determinations as to whether log records are durably persisted at the quorum set. In some embodiments, log records identified as durable at the quorum set may be acknowledged by a storage client to another system, such as a client of the storage client that may have initiated the update.

In various embodiments, the method illustrated in FIG. 8 may be performed in order to allow for asynchronous processing of updates to data stored in a quorum set of a log-structured distributed storage system. For instance, in some embodiments log records may be sent in batches in order decrease the amount of traffic. Log records may be received at storage nodes in different orders than sent by a storage client. Log records may be lost, corrupted, or delayed due to various well-known factors in distributed systems, such as network congestion or errors, workload, failures, or other performance characteristics of a particular storage node sent the log record. Thus, in various embodiments, log records may be acknowledged back to a storage client in different orders than sent. Similarly, a write quorum requirement may established as satisfied for a log record at the quorum set in a different order than sent, or according to the log record sequence for log records. A storage client may track which log records have been made durable at a quorum set in order to a point in the log records sequence that is complete. Such a point in the log record may be different than completion points at individual storage nodes in the quorum set.

As noted above, another method for accessing the data at a log-structured distributed storage system is performing a read request. FIG. 9 is a high-level flowchart illustrating various methods and techniques to perform read requests in a log-structured distributed storage system implementing individual write quorums, according to some embodiments. As indicated at 910, storage system metadata may be maintained for each log record that indicates the different storage nodes that have acknowledged the log record, in various embodiments. For example, a storage client may maintain an in-memory data structure, such as a mapping index for log records, which identifies each storage node that has sent an acknowledgment of a log record.

A read request associated with a particular view of the data may be received, as indicated at 920. Read requests may, in some embodiments, be associated with a particular point in time such as a log sequence number other indicator of position in the log record sequence. Storage clients may also have need to access a particular version of the data, such as a particular data page at a certain point in time (e.g., to provide a point in time restore or other past version of data for storage client operations).

As indicated at 930, a storage node of the quorum set (or multiple storage nodes) that maintains the particular view of the data may be selected to service the read request based, at least in part, on the storage system metadata, in various embodiments. For example, the storage system metadata may be scanned to determine which storage nodes have acknowledged the log records sufficient to maintain the view of the data request. If, for instance, the view of the data is at a particular LSN 12445, then the storage system metadata may be evaluated to determine which storage node has a complete sequence of log records up to LSN 12445 (even if the storage node may not have later log records). For a storage node that does have a complete sequence up to LSN 12445, the storage node may be selected. If more than one storage node maintains a view of the data associated with a read request, various different load balancing schemes or other resource limitations or selection rules may, in some embodiments, be employed to determine a particular storage node to send the read request to. In some embodiments, read request may be sent to multiple storage nodes to service the read request.

The read request may then be sent to the selected storage node to be service, as indicated at 940. In some embodiments, as discussed above with regard to FIGS. 2-7, storage nodes may apply log records maintained at the storage node in order to generate the requested version of data (such as a version of a particular data page or block) to send back to the storage client.

For a log-structured, distributed storage system that implements individual write quorums, different storage nodes in a quorum set may store some log records that other storage nodes do not store. However, in order to service read requests by generating the requested version at the individual storage nodes, missing log records may eventually need to be obtained. Moreover, various other operations at the storage nodes, such as recovering from a failure of a storage client, may rely upon storage nodes in the quorum set maintaining a complete sequence of log records. Various different synchronization protocols or replication techniques may be employed in order to obtain missing log records at individual storage nodes, advancing the complete set of log records maintained at an individual storage node according to the log record sequence. FIG. 10 is a high-level flowchart illustrating various methods and techniques for replicating log records among storage nodes in a quorum set implementing individual write quorums, according to some embodiments.

In various embodiments, log records maintained at a storage node in quorum set at the log-structured distributed storage system may be evaluated according to a log record sequence in order to determine a completion point for the log records. In some embodiments, the log record sequence may be indicated by log sequence numbers, or other position indicators in the log records sequence. In some embodiments, the quorum set may be one of many quorum sets (such as the various different protection groups illustrated in FIG. 7) that together store a data volume. In embodiments such as these, log sequence number indicators may indicate a position in a log record sequence for the entire data volume, and may not provide a sequence of log records for a particular quorum set. Thus, in some embodiments, metadata included with log records sent to storage nodes in a protection group may include indicators (e.g., links, pointers, actual LSN values) of a prior log sequence number of a log record maintained at the quorum set so that the position of a log record in the log record sequence for the quorum set may be determined based, at least in part, on the metadata included with log records.

However the log record sequence for the storage node and/or quorum set is determined, in some embodiments, the log records maintained at a particular node may be traversed according to the log record sequence until a first break, gap, or missing log record is determined. Storage nodes may, in various embodiments, maintain mapping information, such as tables, indexes, or other data structures, that chain together the log records stored at the storage node. The mapping information for the storage node may be used to locate the first break, gap or missing log record in the log record sequence. The log record immediately prior to the first break, gap, or missing log record may be identified as the sequence completion point. Please note, that the prior log record may not be not be an LSN value or position indicator that is contiguous with the missing log record (e.g., LSN 11119 prior to LSN 11120) in some embodiments, but may be an LSN value that is less than the missing log record (e.g., LSN 11115 prior to LSN 11120).

Each storage node may be configured to perform an evaluation of log records maintained at the storage node in order to determine a completion point for the log records maintained at the storage node. Moreover, as each storage node may perform its own evaluation, each storage node may, in some embodiments, perform the determination of its respective completion point independent of storage nodes, or in parallel with the other storage nodes.

As indicated at 1020, sequence completion points from other storage nodes in the quorum set may be received at the storage node, as indicated at 1020. For instance, each storage node may periodically broadcast its completion point to the other storage nodes in the quorum set, or storage nodes may request the completion point from one another. Whether a push or pull method, various different polling techniques may be used by the storage node.

In some embodiments, another storage node in the quorum set may be identified as advanced further in the log record sequence than the current storage node, as indicated at 1030, based, at least in part, on the sequence completion point for the current storage node and the received completion points for the other storage nodes. For example, if the completion point for the current storage node is at LSN 11224 and the received completion point for another storage node is LSN 11364, then the other storage node may be identified as further advanced in the log record sequence. Multiple storage nodes may be identified as further advanced than the current storage node, in some embodiments. In at least some embodiments, no further advanced storage nodes may be determined, in which case the method may be performed repeatedly, periodically, or aperiodically until a storage node with a further advanced completion point is identified.

As indicated at 1040, additional log records from the identified storage node that complete the log record sequence between the completion point for the current storage node and the identified storage node may be request, in some embodiments. For example, if multiple storage nodes are determined to be more advanced, different ranges of log records may be requested from each of the different storage nodes to complete the sequence. As in the example given above, if a single node is identified, then the entire range of log records may be requested from the identified node (e.g., LSNs 11225-11364). In some embodiments, only some of the log records to complete the sequence may be request at a single time, according to various different background processing constraints for performing the techniques illustrated in FIG. 10.

In response to receiving the requested additional log records, the sequence completion point for the current storage node may be advanced to include the received log records, as indicated at 1050. The additional log records may be maintained along with the other log records received from the storage client. Metadata for the log records may also be included, such as pointers or indicators of previous log sequence numbers of log records maintained at the protection group. In some embodiments, the storage node may send a notification of the advanced sequence completion point to the storage client.

The various methods and techniques discussed with regard to FIG. 10 may, in some embodiments, be performed as part of background processing at storage nodes. Whereas, receiving log records and performing read requests, may be considered foreground processing. Storage nodes in a quorum set actively performing the methods and techniques discussed above with regard to FIG. 10 may eventually allow for all of the storage nodes in the quorum set to store a complete sequence of log records, even if initially, a write quorum requirement for the storage nodes may not require that all of the storage nodes maintain a respective copy of a log record. For example, if one storage node is able to advance its respective sequence completion point based on log records it has received from another storage node, then those newly acquired log records may complete the log record sequence for that storage node to be higher than one of the storage nodes that had previously sent it log records. Those storage nodes in turn may advance their own completion points based on log records that are now available for replication from the storage node that was originally less advanced in the log record sequence. As a result of back and forth requests among different storage nodes, in some embodiments, storage nodes may converge on a common sequence completion point. In some embodiments, storage nodes of the quorum set may implement these techniques as part of a gossip, or peer-to-peer protocol.

As has been noted above, a storage client, such as the database service illustrated above in FIGS. 2-5, may maintain metadata about the storage system, such as information about log records that have been made durable (e.g., satisfied a write quorum requirement). In the event of a failure of the storage client, this information may be lost, as well as various other information about the current state or view of the data stored in the quorum set. FIG. 11 is a high-level flowchart illustrating various methods and techniques for performing recovery of a storage client of a log-structured distributed storage system implementing individual write quorums, according to some embodiments.

As indicated at 1110, a storage client may recover from failure, in various embodiments. The recovered storage client may be the same storage client that failed, or may be, in some embodiments, be a new storage client (either physical or virtual—such as a new virtual compute instance). The failure may be a failure of the system implementing the storage client, such as a hardware, power, or other system failure, or may be a failure of the individual application or process implementing the storage client, such as process crash, deadlock, etc. . . . In order to determine a consistent state of the log, and thus the data maintained at the quorum set, a truncation point in the log record sequence may be determined.

As indicated at 1120, a determination may be made that a respective sequence completion point for different storage nodes in the quorum set storing data for the storage client is the same sufficient to satisfy a recovery quorum requirement, in various embodiments. In some embodiments, a recovery quorum requirement may be a set of storage nodes that includes a read quorum group and a write quorum group. Stated another way, a set of quorum nodes that satisfies the larger of a read quorum requirement or a write quorum requirement may also satisfy the recovery quorum requirement. For example, in some embodiments, if a write quorum requirement is $4/5$ and a corresponding read quorum requirement is $2/5$, then $4/5$ storage nodes that have the same respective sequence completion point may meet the recovery quorum requirement. If the sequence completion points do not satisfy the recovery quorum requirement, recovery may wait until the sequence completion points do satisfy the recovery quorum requirement, in some embodiments. For example, a delay or period of time may expire before requesting sequence completion points from the storage nodes again, and again determining whether or not the sequence completion points satisfy the recovery quorum requirement. This waiting or delay period may, in some embodiments, allow for replication or synchronization techniques, such as those discussed above with regard to FIG. 10, to advance sequence completion points at each of the storage nodes in the quorum set, until they converge on a common sequence completion point. By implementing a recovery quorum requirement, a truncation point may be able to be determined that may exclude log records that are not eligible for recovery by failing to meet a read quorum requirement and insufficiently durable by failing to meet a write quorum requirement.

In order to make this determination, a request may be made to each of the storage nodes in the quorum set for the sequence completion point, in some embodiments. The various different techniques discussed above with regard to element 1010 in FIG. 10 may be implemented to determine the sequence completion point at each of the storage nodes. The storage nodes may have already identified the completion point prior to the request, or in some embodiments, may perform the evaluation to determine the completion point in response to the request. The storage nodes in the quorum set may send the sequence completion points in response.

A truncation point that indicates a portion of the log record sequence to exclude log records identified as within the indicated portion of the log record sequence may be identified, as indicated at 1130. The truncation point may be used to exclude a portion of the log record sequence after the point determined the log record sequence from the completion points. For example, if the truncation point is determined to be LSN 13500, then a certain number of LSN values after LSN 13500 may be excluded, such as 1,000 values (through LSN 14500). The storage client may determine the endpoint of the truncation based on a last LSN assigned to a log record prior to the database failure. Alternatively, the storage service itself may indicate to the storage client highest LSN value received. Either method, or various other methods, may be used to determine the end point of the truncation in the log. The indicated portion of log records to exclude in the log record sequence may be large enough to ensure that log records that were in-flight to the quorum set (or only persisted on less than a write quorum of storage nodes) may not be applied to service read requests for data. In some embodiments, LSNs are monotonically increasing, and thus the excluded LSN range in the truncation point may not be reused. The truncation point may be sent to the storage nodes in the quorum set, in some embodiments, so that the storage nodes themselves may exclude log records (such as those log records that may have been inflight when a storage client failure occurred) that are indicated for exclusion by the truncation point.

Once the truncation point is recovered, the data may be made available for access requests according to a view of the data after the truncation point, as indicated at 1140. LSNs may, in some embodiments, be assigned to new log records after the excluded portion indicated by the truncation point. In various embodiments, storage nodes may enforce the truncation point, such as by excluding the indicated log records within the portion of the log record sequence indicated by the truncation point, when performing various operations, such as read operations.

In some embodiments, a storage client may recover to find that several storage nodes in the quorum set have failed (such as may be caused by a catastrophic failure at a data center or other common data storage or computational site). In such cases, several different techniques or methods may be employed. For example, in some embodiments, log records and data maintained at storage nodes may be periodically (or aperiodically) backed up to a data archive service, such as one of the other virtual computing services 230 discussed above with regard to FIG. 2. Data and log records may be obtained from the archive service and sent to new storage nodes added to the quorum set to replace one or more of the failed storage nodes.

Another technique to recover from catastrophic failure may be to lessen the requirements for durability at a storage node. For example, in some embodiments a read quorum of storage nodes may need to be available, and a log record may have to be maintained by at least one such available storage node to be considered eligible to be committed to the log for log-structured storage (such as for recovery purposes). Thus if a read quorum requirement 4/7 of storage nodes, then at least four storage nodes may need to be available to recover, and a log record may need to be considered eligible to be committed if maintained at any one of the at least four available storage nodes. However, by relaxing the requirement to less than a read quorum requirement (which may then not satisfy a recovery quorum requirement), or even to a single available storage node, the completion point for the quorum set (such as a truncation point) can be determined that may potentially allow recovery to a more recent point in time than that provided by an external backup (such as the data archive service mentioned above). Such a relaxed recovery mechanism may not guarantee recovery of the most recently completed committed write operations, but is likely to include most records that were written more than a short time in the past.

In some embodiments, a storage client may be notified of the catastrophic failure and asked to select a recovery option, such as from the data archive or by loosening the durability requirements for the quorum set. Clients make send a response or initiate a command that triggers one or more of the different recovery methods.

The various methods as illustrated in the figures and described herein represent example embodiments of methods. The order of any method may be changed, and various elements may be added, reordered, combined, omitted, modified, etc. The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 12:
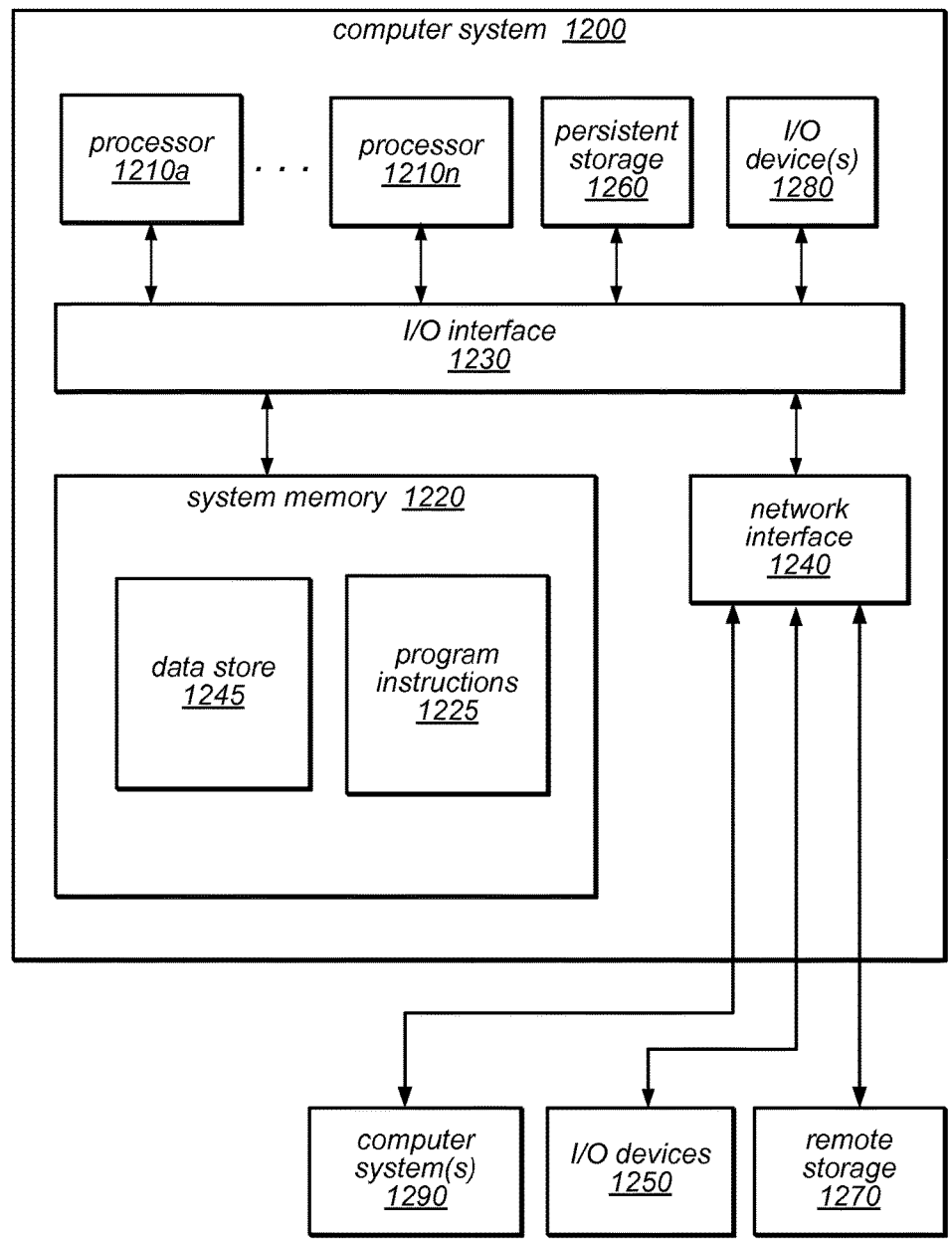
FIG. 12 is an example computer system, according to various embodiments.

FIG. 12 is a block diagram illustrating a computer system configured to implement at least a portion of the database systems described herein, according to various embodiments. For example, computer system 1200 may be configured to implement a database engine head node of a database tier, or one of a plurality of storage nodes of a separate distributed storage system that stores databases and associated metadata on behalf of clients of the database tier, in different embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.). For example, a client application executing on system 1200 may use network interface 1240 to communicate with a server application executing on a single server or on a cluster of servers that implement one or more of the components of the database systems described herein. In another example, an instance of a server application executing on computer system 1200 may use network interface 1240 to communicate with other instances of the server application (or another server application) that may be implemented on other computer systems (e.g., computer systems 1290).

In the illustrated embodiment, computer system 1200 also includes one or more persistent storage devices 1260 and/or one or more I/O devices 1280. In various embodiments, persistent storage devices 1260 may correspond to disk drives, tape drives, solid state memory, other mass storage devices, or any other persistent storage device. Computer system 1200 (or a distributed application or operating system operating thereon) may store instructions and/or data in persistent storage devices 1260, as desired, and may retrieve the stored instruction and/or data as needed. For example, in some embodiments, computer system 1200 may host a storage system server node, and persistent storage 1260 may include the SSDs attached to that server node.

Computer system 1200 includes one or more system memories 1220 that are configured to store instructions and data accessible by processor(s) 1210. In various embodiments, system memories 1220 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

System memory 1220 may contain program instructions 1225 that are executable by processor(s) 1210 to implement the methods and techniques described herein. In various embodiments, program instructions 1225 may be encoded in platform native binary, any interpreted language such as Java™ byte-code, or in any other language such as C/C++, Java™, etc., or in any combination thereof. For example, in the illustrated embodiment, program instructions 1225 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1225 may implement multiple separate clients, server nodes, and/or other components.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include data store 1245, which may be configured as described herein. For example, the information described herein as being stored by the database tier (e.g., on a database engine head node), such as a transaction log, an undo log, cached page data, or other information used in performing the functions of the database tiers described herein may be stored in data store 1245 or in another portion of system memory 1220 on one or more nodes, in persistent storage 1260, and/or on one or more remote storage devices 1270, at different times and in various embodiments. Similarly, the information described herein as being stored by the storage tier (e.g., redo log records, coalesced data pages, and/or other information used in performing the functions of the distributed storage systems described herein) may be stored in data store 1245 or in another portion of system memory 1220 on one or more nodes, in persistent storage 1260, and/or on one or more remote storage devices 1270, at different times and in various embodiments. In general, system memory 1220 (e.g., data store 1245 within system memory 1220), persistent storage 1260, and/or remote storage 1270 may store data blocks, replicas of data blocks, metadata associated with data blocks and/or their state, database configuration information, and/or any other information usable in implementing the methods and techniques described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems 1290 (which may implement one or more storage system server nodes, database engine head nodes, and/or clients of the database systems described herein), for example. In addition, network interface 1240 may be configured to allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
  a plurality of storage nodes implementing a quorum set of a distributed storage system, wherein each storage node in the quorum set maintains a log-structured data store storing data for a storage client; and
  a client-side storage driver module implemented on one or more computing devices of the storage client, configured to:
    receive one or more updates to the data;
    generate a plurality of log records indicating the one or more updates;
    send each of the plurality of log records to at least some of the storage nodes of the quorum set sufficient to satisfy a write quorum requirement;
    for each log record:
      receive acknowledgments from at least some storage nodes of the quorum set; and
      determine that the acknowledgments received for the log record satisfy the write quorum requirement indicating that the log record is made durable at the quorum set, wherein at least one of the storage nodes of the quorum set satisfying the write quorum requirement for one of the plurality of log records is different from the storage nodes of the quorum set satisfying the write quorum requirement for another of the plurality of log records;
    determine that a respective instance of a sequence completion point for different ones of the storage nodes of the quorum set is the same sufficient to satisfy a recovery quorum requirement;
    identify the sequence completion point as a truncation point in a log record sequence for the quorum set for a recovery operation;
    recover log records in the log record sequence generated up to the truncation point, wherein log records in the log record sequence generated after the truncation point are excluded from the recovery operation; and
    make the data available for processing access requests.

2. The system of claim 1, wherein the client-side storage driver module is further configured to:
  maintain storage system metadata for each log record that indicates the different storage nodes of the quorum set acknowledging the log record;
  receive a read request associated with a particular view of the data;
  in response to receiving the read request:
    based, at least in part, on the storage system metadata, identify at least one storage node of the quorum set to service the read request that maintains the particular view of the data; and
    send the read request to the at least one storage node.

3. The system of claim 1, wherein each of the plurality of storage nodes in the quorum set is configured to:
  evaluate the log records stored at the storage node according to a the log record sequence in order to determine a sequence completion point for the log records stored at the storage node;
  obtain another sequence completion point for each of one or more other storage nodes in the quorum set;
  based, at least in part, on the sequence completion point for the storage node and the obtained other sequence completion points for each of the one or more other storage nodes in the quorum set, identify at least one storage node of the one or more other storage nodes in the quorum set advanced further in the log record sequence than the storage node;
  request one or more additional log records from the identified at least one storage node that complete the log record sequence between the sequence completion point for the storage node and the other sequence completion point for the identified at least one storage node; and
  in response to receiving the requested one or more additional log records, advance the sequence completion point for the storage node to include the one or more additional log records.

4. The system of claim 1, wherein each of the plurality of storage nodes implementing the quorum set maintains a respective sequence completion point for log records stored at the storage node according to the log record sequence, and wherein the recovery operation is an operation to recover from failure of the storage client.

5. A method, comprising:
  performing, by a plurality of computing devices:
    sending each of a plurality of log records indicating updates to data to at least some storage nodes of a plurality of storage nodes implementing a quorum set storing the data for a storage client that are sufficient to satisfy a write quorum requirement, wherein the plurality of log records are sent according to a log record sequence;

for each log record:
  receiving acknowledgments of the log record from at least some storage nodes of the quorum set;
  determining that the acknowledgments received for the log record satisfy the write quorum requirement indicating that the log record is made durable at the quorum set, wherein at least one of the storage nodes of the quorum set satisfying the write quorum requirement for one of the plurality of log records is different from the storage nodes of the quorum set satisfying the write quorum requirement for another of the plurality of log records;
  determining that a respective instance of a sequence completion point for different ones of the storage nodes of the quorum set is the same sufficient to satisfy a recovery quorum requirement;
  identifying the sequence completion point as a truncation point in the log record sequence for the quorum set for a recovery operation;
  recovering log records in the log record sequence generated up to the truncation point, wherein log records in the log record sequence generated after the truncation point are excluded from the recovery operation; and
  making the data available for processing access requests.

6. The method of claim 5, wherein no individual storage node of the different storage nodes maintains all of the plurality of log records.

7. The method of claim 5, wherein at least some of the plurality of log records are received at the different ones of the plurality of storage nodes in an order different than the log record sequence.

8. The method of claim 5, further comprising evaluating, at each of one or more of the plurality of storage nodes in the quorum set, log records maintained at the storage node according to the log record sequence in order to determine a respective sequence completion point for the log records maintained at the respective storage node.

9. The method of claim 8, further comprising:
  performing, by each of the one or more storage nodes:
    receiving another sequence completion point from each of one or more other storage nodes in the quorum set;
    based, at least in part, on the respective sequence completion point for the storage node and the received other sequence completion point for each of the one or more other storage nodes in the quorum set, identifying at least one storage node in the quorum set advanced further in the log record sequence than the storage node;
    requesting one or more additional log records from the identified at least one storage node that complete the log record sequence between the respective sequence completion point for the storage node and the received others sequence completion point for the identified at least one storage node; and
    in response to receiving the requested one or more additional log records, advancing the respective sequence completion point for the storage node to include the one or more additional log records.

10. The method of claim 8, wherein said sending is performed by the storage client, wherein said evaluating is performed by each of the one or more storage nodes of the plurality of storage nodes in the quorum set, and wherein the recovery operation is an operation to recover from failure of the storage client.

11. The method of claim 10, wherein one or more storage nodes of the plurality of storage nodes implementing the quorum set fails such that the write quorum requirement for one or more log records maintained by the respective sequence completion point for at least one remaining storage node of the quorum set is not the same sufficient to satisfy the recovery quorum requirement, wherein said identifying the truncation point in the log record sequence, and said sending the one or more additional log records to the different ones of the plurality of storage nodes implementing the quorum are performed with regard to the at least one remaining storage node.

12. The method of claim 5, further comprising:
  maintaining storage system metadata that identifies the different ones of the storage nodes in the quorum set that acknowledge each of the plurality of log records;
  receiving a read request associated with a particular view of the data;
  selecting at least one storage node in the quorum set to service the read request based, at least in part, on the storage system metadata; and
  sending the read request to the selected at least one storage node in order to be serviced.

13. The method of claim 5, wherein the storage client is a database node implemented as part of a network-based database service, and wherein the plurality of storage nodes in the quorum set are implemented as part of a network-based storage service.

14. A non-transitory, computer-readable storage medium, storing program instructions that when executed by one or more computing devices cause the one or more computing devices to implement a client-side storage driver module that implements:
  sending each of a plurality of log records indicating updates to data to at least some storage nodes of a plurality of storage nodes implementing a quorum set storing the data for a storage client that are sufficient to satisfy a write quorum requirement, wherein the plurality of log records are sent in order according to a log record sequence;
  for each log record:
    receiving acknowledgments of the log record from at least some storage nodes of the quorum set, wherein acknowledgements for at least a subset of the plurality of log records are received in an order different than an order corresponding to the log record sequence; and
    determining that the acknowledgments received for the log record satisfy the write quorum requirement indicating that the log record is made durable at the quorum set, wherein at least one of the storage nodes of the quorum set satisfying the write quorum requirement for one of the plurality of log records is different from the storage nodes of the quorum set satisfying the write quorum requirement for another of the plurality of log records; and
  determining that a respective instance of a sequence completion point for different ones of the storage nodes of the quorum set is the same sufficient to satisfy a recovery quorum requirement;
  identifying the sequence completion point as a truncation point in the log record sequence for the quorum set for a recovery operation;

recovering log records in the log record sequence generated up to the truncation point, wherein log records in the log record sequence generated after the truncation point are excluded from the recovery operation; and making the data available for processing access requests.

15. The non-transitory, computer-readable storage medium of claim 14, wherein, in said sending the plurality of log records corresponding to the log record sequence to be maintained at the different ones of the plurality of storage nodes, the client-side storage driver module implements grouping different ones in the plurality of log records into one or more batches of log records to be sent to the different ones of the plurality of storage nodes together.

16. The non-transitory, computer-readable storage medium of claim 14, wherein the client-side storage driver module further implements:
    maintaining storage system metadata that identifies the different ones of the storage nodes in the quorum set that acknowledge each of the plurality of log records;
    receiving a read request associated with a particular view of the data;
    selecting at least one storage node in the quorum set to service the read request based, at least in part, on the storage system metadata; and
    sending the read request to the selected at least one storage node in order to be serviced.

17. The non-transitory, computer-readable storage medium of claim 14, wherein the one or more storage nodes acknowledging the log record in satisfaction of the write quorum requirement different from the storage nodes acknowledging the other log record in satisfaction of the write quorum requirement is one or more additional storage nodes added to the quorum set as a result of not receiving an acknowledgment for a particular write request within a period of time.

18. The non-transitory, computer-readable storage medium of claim 14, wherein the program instructions cause another plurality of computing devices implementing the plurality of storage nodes in the quorum set to each implement:
    evaluating log records maintained at the storage node according to the log record sequence in order to determine a respective sequence completion point for the log records maintained at the respective storage node;
    receiving another sequence completion point from each of one or more other storage nodes in the quorum set;
    based, at least in part, on the respective sequence completion point for the storage node and the received other sequence completion point for each of the one or more other storage nodes in the quorum set, identifying at least one storage node in the quorum set advanced further in the log record sequence than the storage node;
    requesting one or more additional log records from the identified at least one storage node that complete the log record sequence between the respective sequence completion point for the storage node and the received other sequence completion point for the identified at least one storage node; and
    in response to receiving the requested one or more additional log records, advancing the respective sequence completion point for the storage node to include the one or more additional log records.

19. The non-transitory, computer-readable storage medium of claim 14, wherein the recovery operation is an operation to recover from failure of the storage client.

20. The non-transitory, computer-readable storage medium of claim 14, wherein the client-side storage driver module is implemented on a database node that is part of a network-based distributed database service, and wherein the plurality of storage nodes are implemented as part of a network-based, multi-tenant storage service.

* * * * *